(12) United States Patent
Arai et al.

(10) Patent No.: US 7,089,663 B2
(45) Date of Patent: *Aug. 15, 2006

(54) FORMING METHOD OF THROTTLE APPARATUS FOR INTERNAL COMBUSTION ENGINE

(75) Inventors: Tsuyoshi Arai, Kariya (JP); Naoki Hiraiwa, Toyokawa (JP); Masami Goto, Kasugai (JP); Katsuya Torii, Anjo (JP)

(73) Assignee: Denso Corporation, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,261

(22) Filed: Nov. 8, 2004

(65) Prior Publication Data

US 2005/0097743 A1    May 12, 2005

(30) Foreign Application Priority Data

Nov. 7, 2003   (JP)   ............... 2003-379204

(51) Int. Cl.
*B21K 1/22* (2006.01)
*B21K 1/20* (2006.01)
*B29C 45/00* (2006.01)

(52) U.S. Cl. ............... 29/888.4; 29/888.45; 29/888.46; 29/527.1; 264/242; 264/328.8; 425/812

(58) Field of Classification Search ......... 29/888.4, 29/888.45, 888.46, 527.1; 264/242, 328.8, 264/328.18, 334, 275; 425/812
See application file for complete search history.

(56) References Cited

U.S. PATENT DOCUMENTS

| | | | |
|---|---|---|---|
| 3,675,888 A * | 7/1972 | Scaramucci | 249/57 |
| 4,995,445 A * | 2/1991 | Shigyo | 164/305 |
| 5,304,336 A | 4/1994 | Karlsson et al. | |
| 5,421,718 A * | 6/1995 | Karlsson et al. | 425/577 |
| 5,794,591 A * | 8/1998 | Kalebjian et al. | 123/337 |
| 6,138,988 A * | 10/2000 | Bouvet et al. | 251/306 |
| 6,451,238 B1 * | 9/2002 | Suzuki et al. | 264/250 |
| 6,764,062 B1 * | 7/2004 | Daly | 251/305 |
| 2002/0163106 A1 * | 11/2002 | Hendry | 264/500 |
| 2005/0022365 A1 | 2/2005 | Arai et al. | |
| 2005/0022781 A1 | 2/2005 | Arai et al. | |
| 2005/0022786 A1 | 2/2005 | Arai et al. | |
| 2005/0022787 A1 | 2/2005 | Arai et al. | |
| 2005/0097744 A1 | 5/2005 | Arai et al. | |
| 2005/0097745 A1 | 5/2005 | Arai et al. | |
| 2005/0120556 A1 | 6/2005 | Arai et al. | |

FOREIGN PATENT DOCUMENTS

| | | |
|---|---|---|
| DE | 101 05 526 A1 | 8/2002 |
| JP | 2000-202866 | 7/2000 |

* cited by examiner

*Primary Examiner*—David P. Bryant
*Assistant Examiner*—Sarang Afzali
(74) *Attorney, Agent, or Firm*—Nixon & Vanderhye PC

(57) ABSTRACT

A throttle valve and the throttle body are formed substantially simultaneously in the same dies. The melted resin is injected in to a cavity through a pair of valve gates. The gas evaporated from a melted resin and remaining air in the cavity are expelled from the cavity into the atmosphere through a gas purge passage. A first and a second split lines of a first and second insert dies function as the gas purge passage. A shortshot and a corrosion generated by the gas can be avoided.

16 Claims, 17 Drawing Sheets

FORMING METHOD OF THROTTLE APPARATUS FOR INTERNAL COMBUSTION ENGINE

CROSS REFERENCE TO RELATED APPLICATION

This application is based on Japanese Patent Application No. 2003-379204 filed on Nov. 07, 2003, the disclosure of which is incorporated herein by reference.

FIELD OF THE INVENTION

The present invention relates to a forming method of a throttle apparatus for an internal combustion engine mounted in a vehicle. Especially, the present invention relates to an injection molding method of a throttle apparatus, in which a throttle valve and a throttle body are substantially simultaneously formed in the same dies.

BACKGROUND OF THE INVENTION

In an electrically controlled throttle apparatus shown in FIG. 16, a driving device such as a motor controls an opening degree of a throttle valve 102 in accordance with a position of an accelerator pedal stepped by a driver. In the throttle apparatus, a clearance is formed between an inner periphery of a substantially tubular throttle body 101 and an outer circumferential periphery of a throttle valve 102, and the clearance has a large influence of an air tightness of the throttle apparatus when the throttle valve 102 is in its full close position.

Conventionally, the throttle body 101 and the throttle valve 102 are independently manufactured in each different process. Subsequently, a manufactured throttle valve 102 is combined with a manufactured throttle body 101 in accordance with an inner peripheral dimension of the manufactured throttle body 101 in a downstream process. Alternatively, a manufactured throttle body 101 is combined with a manufactured throttle valve 102 in accordance with an outer circumferential dimension of the throttle valve 102 in a downstream process. Thus, a predetermined clearance is obtained between the bore inner periphery of the throttle body 101 and the outer circumferential periphery of a throttle valve 102. A throttle shaft 103 integrally rotates with the throttle valve 102. Both of the ends of the throttle shaft 103 are rotatably supported by cylindrical bearings 104 provided in the throttle body 101.

U.S. Pat. No. 5,304,336, which is a counterpart of JP-5-141540A, shows molding methods in which a manufacturing process of the throttle body and the throttle valve is reduced. In the molding methods, the throttle body 101 and the throttle valve 102 shown in FIG. 17 are integrally molded of a resinous material in the same molding dies. At first, the substantially tubular throttle body 101 is integrally molded of a resinous material. Subsequently, inner periphery (bore inner periphery) of the throttle body 101 is used as a part of a molding die molding the throttle valve 102, and the throttle valve 102 is molded. Thus, a shape of an outer circumferential periphery of the throttle valve 102 is adapted to a shape of the bore inner periphery of the throttle body 101 in the above molding methods.

The molded throttle body 101 is gradually cooled in the body cavity to be solidified. Subsequently, the movable die is slid forward in order to form a valve cavity, into which a resinous material is filled. The throttle valve 102 is molded of a resinous material in the throttle body 101.

However, in the above molding methods of the throttle valve 102, the throttle body 101 is molded of a resinous material while the molded throttle body 101 is restricted by dies in its radial direction and in its substantially circumferential direction. Thus, the throttle valve 102 is molded of a resinous material while the throttle body 101 and the throttle valve 102 are restricted by the dies. The throttle body 101 and the throttle valve 102 are taken out of the dies, and gradually cooled. In this cooling period, the unrestricted throttle body 101 and the throttle valve 102 are contracted. The throttle body 101 and the throttle valve 102 are deformed. Accordingly, it is difficult to maintain the clearance in a predetermined dimension between the inner periphery of the throttle body 101 and the outer circumferential periphery of the throttle valve 102.

A practical use of the throttle apparatus releases an internal stress, by which the apparatus is deformed. When the throttle apparatus is made from a crystal resin and is crystallized, the apparatus is deformed due to the crystallization thereof. Even the apparatus is annealed or aged, the throttle body 101 and the throttle valve 102 are deformed individually.

To solve the above problem, the inventors filed Japanese patent application No. 2003-285434 on Aug. 1, 2003. In this application, the throttle valve and throttle body is formed in a same die in such a manner that the throttle valve 102 is opened in a predetermined angle as shown in FIG. 18. As shown in FIG. 19, the molding dies include a first insert die 121 and a second insert die 122. The first insert die 121 is disposed in the fixed die and has a first valve cavity 111 to form a first semi-circle plate 106. The second insert die 122 is disposed in the movable die and has a second valve cavity 112 to form a second semi-circle plate 107. FIG. 20 shows a valve gate by an arrow 123, through which a melted resin material is injected into the first and the second valve cavity 111, 112. An air in the cavity and a gas generated from the injected resin remain in a lower portion of the cavity to cause a defect of the throttle valve 102. That is, the melted resin material flows into the cavity 111, 112 from the top of the cavity 112 and flows down to the bottom of the cavity 111. The air and the gas cannot be purged from the cavity, so that a shortshot where the melted resin material is not charged can be generated as shown in FIG. 21. Alternatively, a corrosion can be generated by the gas at the bottom end of the throttle valve 106.

When the valve gate is disposed at a side surface of a throttle shaft 103, the melted resin material flows from the center of the throttle valve 102 to the outer periphery of the throttle valve 102. The air and the gas are pushed toward the radial end of the throttle valve 102, by which the shortshot and/or the corrosion by the gas can be generated as shown in FIG. 23.

The circularity of the throttle valve 102 is deteriorated. Thus, when the throttle valve 102 closes the throttle body 101, a clearance between the inner surface of the throttle body 101 and the outer surface of the throttle valve 102 becomes large to increase an air leakage there between.

SUMMARY OF THE INVENTION

An object of the present invention is to provide a forming method of the throttle apparatus in which a predetermined clearance is maintained between the inner periphery of the throttle body and the outer periphery of the throttle valve, and in which the deformation of the throttle valve is avoided.

According to the present invention, a forming method of a throttle apparatus for an internal combustion engine is conducted as follows.

At first, clamping a pair of molding dies to form a body cavity and a valve cavity therein, the body cavity being for molding a throttle body and the valve cavity being for molding a throttle valve. Next, injecting a melted material into the body cavity and the valve cavity is carried out. Next, moving a die away from the other die in order to eject a solidified molding is carried out.

A gas evaporated from the melted material in the body cavity and the valve cavity is expelled from the body cavity and the valve cavity through a gas purge passage.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 1:
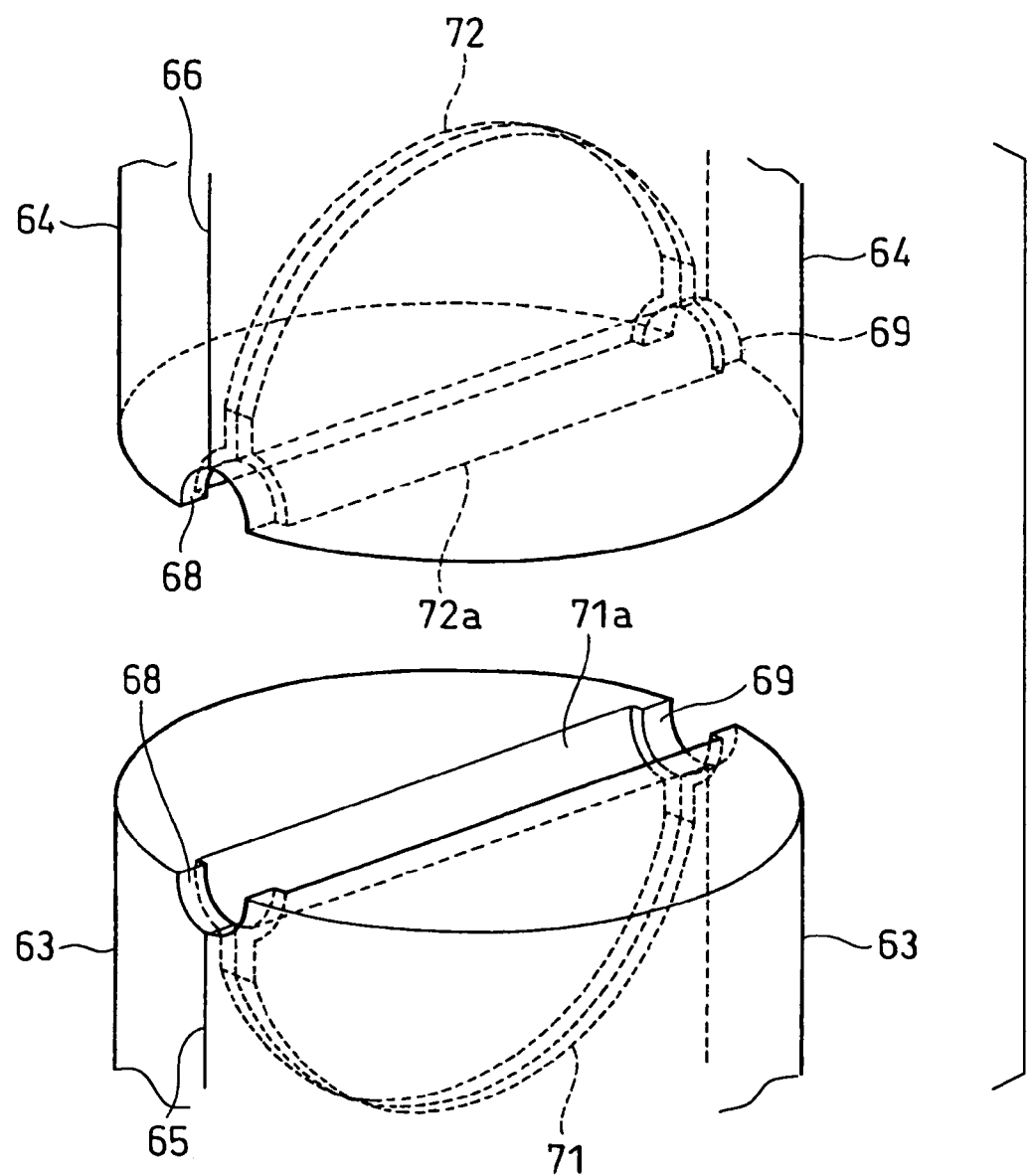
FIG. 1 is a perspective view of a first insert die and a second insert die according to a first embodiment of the present invention.

An embodiment of the present invention will be described hereinafter with reference to the drawings.

First Embodiment

As shown in FIGS. 1 to 10, a throttle control apparatus has a driving motor 1, a throttle body 2, a throttle valve 3, a coil spring 4, and an electronic control unit which is referred to as ECU hereinafter. The driving motor 1 functions as a power source. The throttle body 2 forms a part of intake passage communicated with each cylinder of an internal combustion engine. The throttle valve 3 controls an amount of intake air flowing into the engine through the throttle body 2. The coil spring 4 urges the throttle valve 3 in the close direction. The ECU electrically controls the opening degree of the throttle valve 3 according to an operation degree (accelerator operation amount) of an accelerator pedal stepped by a driver.

The ECU is electrically connected with an accelerator position sensor (not shown) which converts the accelerator operation amount into an accelerator position signal. The accelerator position signal represents the accelerator operation amount. The electrically controlled throttle apparatus has a throttle position sensor that converts an opening degree of the throttle valve 3 into an electronic signal (throttle position signal) in order to output the throttle position signal to the ECU. The throttle position signal represents an opening degree of the throttle valve 3. The ECU performs PID (proportional, integral and differential [derivative]) feedback control with respect to the driving motor 1 in order to eliminate deviation between the throttle position signal transmitted from the throttle position sensor and the accelerator position signal transmitted from the accelerator position sensor.

The throttle position sensor is constructed with permanent magnets 6, yokes (not shown), a Hall effect device (not shown), a terminal (not shown), a stator (not shown) and the like. The permanent magnets 6 are separated rectangular magnets used for generating a magnetic field. The yokes are constructed with separated substantially arc-shaped pieces, and are magnetized by the permanent magnets 6. The hall element is integrally provided with a sensor cover 7 to be opposed to the separated permanent magnets 6. The stator is made of a ferrous metallic material for concentrating magnetic flux into the hall element. The separated permanent magnets 6 and the separated yokes are secured to the inner periphery of a valve gear 8, which constructs the reduction gears, using glue or the like.

The sensor cover 7 is formed of a resinous material such as thermoplastic resin in a predetermined shape, in order to electrically insulate between terminals of the throttle position sensor and power-supply terminals of the driving motor 1. The sensor cover 7 has an engaging part that engages with a corresponding engaged part, which is formed on the opening side of the gearbox part 22 of the throttle body 2, each other. The engaging part of the sensor cover 7 and the engaged part of the gearbox part 22 are connected using a rivet, a screw (not shown), or are thermally swaged with each other. A cylindrical shaped receptacle 7a is integrally molded with the sensor cover 7 to be connected with an electrical connector (not shown).

A driving unit rotating the throttle valve 3 in the opening or closing direction includes the driving motor 1, and a reduction gear which transmits the driving force of the driving motor 1 to the throttle valve 3 through a metal shaft 5. The driving motor 1 is connected with terminals which are provided in the sensor cover 7. The driving motor 1 is fixed on the throttle body 2 with a screw 9.

The reduction gears reduce rotation speed of the driving motor 1 by a predetermined reduction gear ratio. The reduction gears (valve driving means, power transmission unit) is constructed with a pinion gear 11, a middle reduction gear 12 and the valve gear 8 for driving the metal shaft 5 that rotates the throttle valve 3. The pinion gear 11 is secured to the outer periphery of the motor shaft of the driving motor 1. The middle reduction gear 12 engages with the pinion gear 11 to be rotated by the pinion gear 11. The valve gear 8 engages with the middle reduction gear 12 to be rotated by the middle reduction gear 12.

The pinion gear 11 is made of a metallic material, and is integrally formed with the motor shaft of the driving motor 1 to be in a predetermined shape, so that the pinion gear 11 serves as a motor gear that integrally rotates with the motor shaft of the driving motor 1. The middle reduction gear 12 is formed to be in a predetermined shape of a resinous material, and is rotatably provided onto the outer periphery of the supporting shaft 14 that serves as a rotation center of the middle reduction gear 12. The middle reduction gear 12 is constructed with a large gear part 15, which engages with the pinion gear 11 of the motor shaft, and a small gear part 16 that engages with the valve gear 13. The supporting shaft 14 is integrally molded with the bottom wall of the gearbox part 22 of the throttle body 2. An end part of the supporting shaft 14 engages with a recess portion formed in the inner wall of the sensor cover 7.

The valve gear 8 is integrally molded to be in a predetermined substantially cylindrical shape of a resinous material. Gear teeth (teeth part) 17 are integrally formed in the outer periphery of the valve gear 8 to engage with the small gear part 16 of the middle reduction gear 12. The outer periphery of the cylindrical part (spring inner periphery guide) of the valve gear 8 supports the diametrically inner periphery of the coil spring 4. A full-close stopper portion 19 is integrally formed with the valve gear 8 on one end plane in the outer circumferential periphery of the valve gear 8, i.e., the gear teeth 17. The full-close stopper portion 19 hooks to the full-close stopper 13 of the gearbox part 22, when the throttle valve 3 is in the idling position, i.e., full close position.

The throttle body 2 is a throttle housing that includes the substantially cylindrical-shaped bore wall part 21 internally forming a circular-shaped intake passage, through which intake air flows into the engine. The bore wall part 21 internally receives the disc-shaped throttle valve 3, such that the throttle valve 3 can open and close the circular-shaped intake passage of the bore wall part 21. The bore wall part 21 rotatably receives the throttle valve 3 in the intake passage (bore), such that the throttle valve 3 can rotate from the full close position to the full open position. The throttle body 2 is screwed onto an intake manifold of the engine using a fasting bolt or a screw (not shown).

The bore wall part 21 of the throttle body 2 is formed in a predetermined shape that has a double-pipe structure, in which a substantially cylindrical-shaped bore outer pipe 32 is arranged on the diametrically outer side of a substantially cylindrical-shaped bore inner pipe 31. The bore inner pipe 31 is an internal side cylindrical part that forms an internal periphery. The bore outer pipe 32 is an external side cylindrical part that forms an outer member. The bore wall part 21 of the throttle body 2 is made of a thermo stable resinous material, such as PPS, PA, PP or PEI. The bore inner pipe 31 and the bore outer pipe 32 have an intake-air inlet part (air intake passage) and an intake-air outlet part (air intake passage). Intake air drawn from an air cleaner (not shown) passes through an intake pipe (not shown), the intake-air inlet part and the intake-air outlet part of the bore wall part 21. Subsequently, the intake air flows into a surge tank of the engine or the intake manifold. The bore inner pipe 31 and the bore outer pipe 32 are integrally molded with each other. The bore inner pipe 31 and the bore outer pipe 32 have a substantially the same inner diameter and a substantially the same outer diameter along with the intake airflow direction, i.e., the direction from the upper side to the lower side in the vertical direction of FIG. 2.

The bore inner pipe 31 internally has an air intake passage, through which intake air flows to the engine. The throttle valve 3 and the metal shaft 5 are rotatably provided in the air intake passage of the bore inner pipe 31. A cylindrical space (annular space) is formed between the bore inner pipe 31 and the bore outer pipe 32, and the cylindrical space is circumferentially blocked, i.e., partitioned, by an annular connecting part 33 at a substantially longitudinally central section thereof. For instance, the substantially longitudinally central section of the cylindrical space is a section along with a circumferential direction of the throttle valve 1 in the full close position. Namely, the substantially longitudinally central section is a circumferential section of the bore wall part 21 passing through the axial center of the throttle shaft. The annular connecting part 33 connects the outer periphery of the bore inner pipe 31 and the inner periphery of the bore outer pipe 32, such that the annular connecting part 33 blocks substantially entirely over the circumferential area of the cylindrical space formed between the bore inner pipe 31 and the bore outer pipe 32.

The cylindrical space between the bore inner pipe 31 and the bore outer pipe 32 located on the axially upstream side with respect to the annular connecting part 33 serves as a blockade recess part (moisture trapping groove) 34 for blocking moisture flowing along with the inner periphery of the intake pipe toward the intake manifold. The cylindrical space between the bore inner pipe 31 and the bore outer pipe 32 located on the axially downstream side with respect to the annular connecting part 33 serves as a blockade recess part (moisture trapping groove) 35 for blocking moisture flowing along with the inner periphery of the intake manifold.

The motor housing part 23, which receives the driving motor 1, is integrally molded of the resinous material with the bore wall part 21 via connecting portion 24 to construct the throttle body 2. The motor housing part 23 is arranged in parallel with the bore wall part 21. That is, the motor housing part 23 is in parallel with the bore wall part 21 with respect to the gearbox part 22 in the throttle body 2. The motor housing part 23 is arranged on the radially outer side of the bore outer pipe 32. The motor housing part 23 is integrally molded of the resinous material with the gearbox part 7. Specifically, the motor housing part 23 is integrally molded with the end face of the gearbox part 22 located on the right side in FIG. 2. The gearbox part 22 has a chamber for rotatably receiving the reduction gears. The motor housing part 23 has a substantially cylindrical sidewall part 25 and a substantially circular shaped bottom wall part 26. The sidewall part 25 extends from the right side face of the gearbox part 22 in the left direction in FIG. 2. The bottom wall part 26 plugs the opening side of the sidewall part 41 on the left side in FIG. 2. The central axis of the sidewall part 25 of the motor housing part 23 is arranged substantially in parallel with the axis of the metal shaft 5, i.e., rotation axis of the throttle valve 3. Besides, the central axis of the sidewall part 25 of the motor housing part 23 is arranged substantially perpendicularly to the central axis of the bore inner pipe 31 of the bore wall part 21.

The bore outer pipe 32 has a stay 27 at the opening end thereof. The stay 27 is a ring shaped portion which is integrally formed and is radially extending from the bore outer pipe 32a. The stay 27 is for fixing the throttle apparatus on the intake manifold and has a plurality of through hole 27a through which bolts are inserted. The stay 27 has an undercut portion 29 which communicates with some of the through hole 27a.

Figure 2:
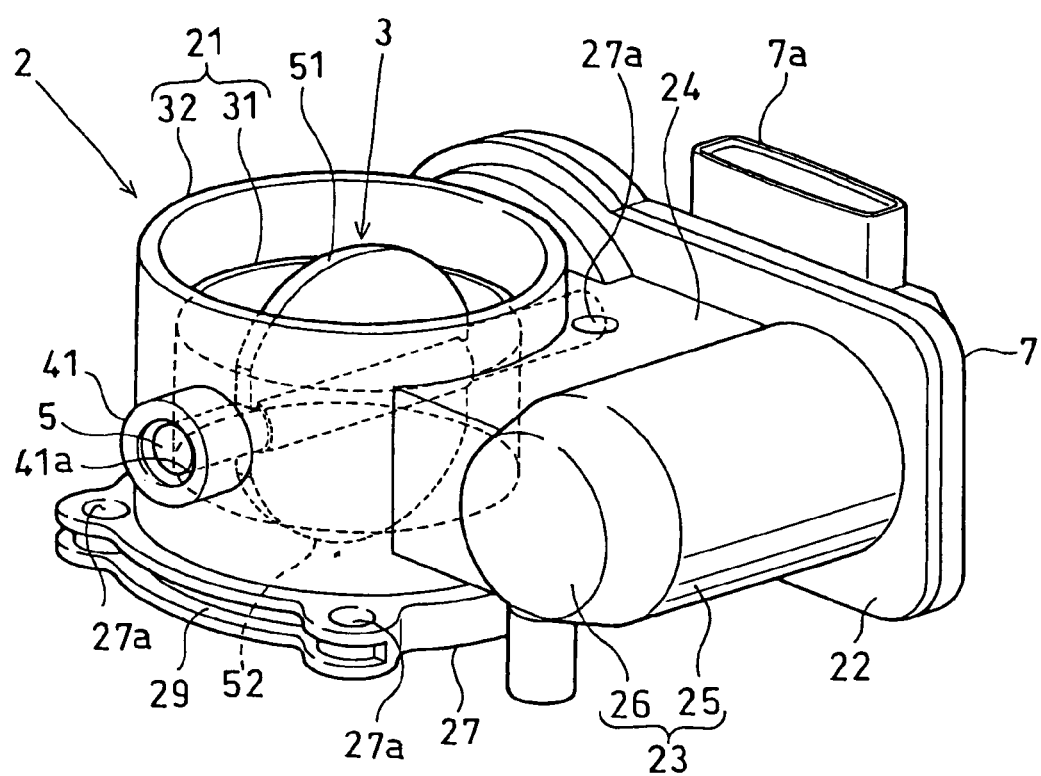
FIG. 2 is a perspective view of a throttle apparatus according to the first embodiment.
Figure 3:
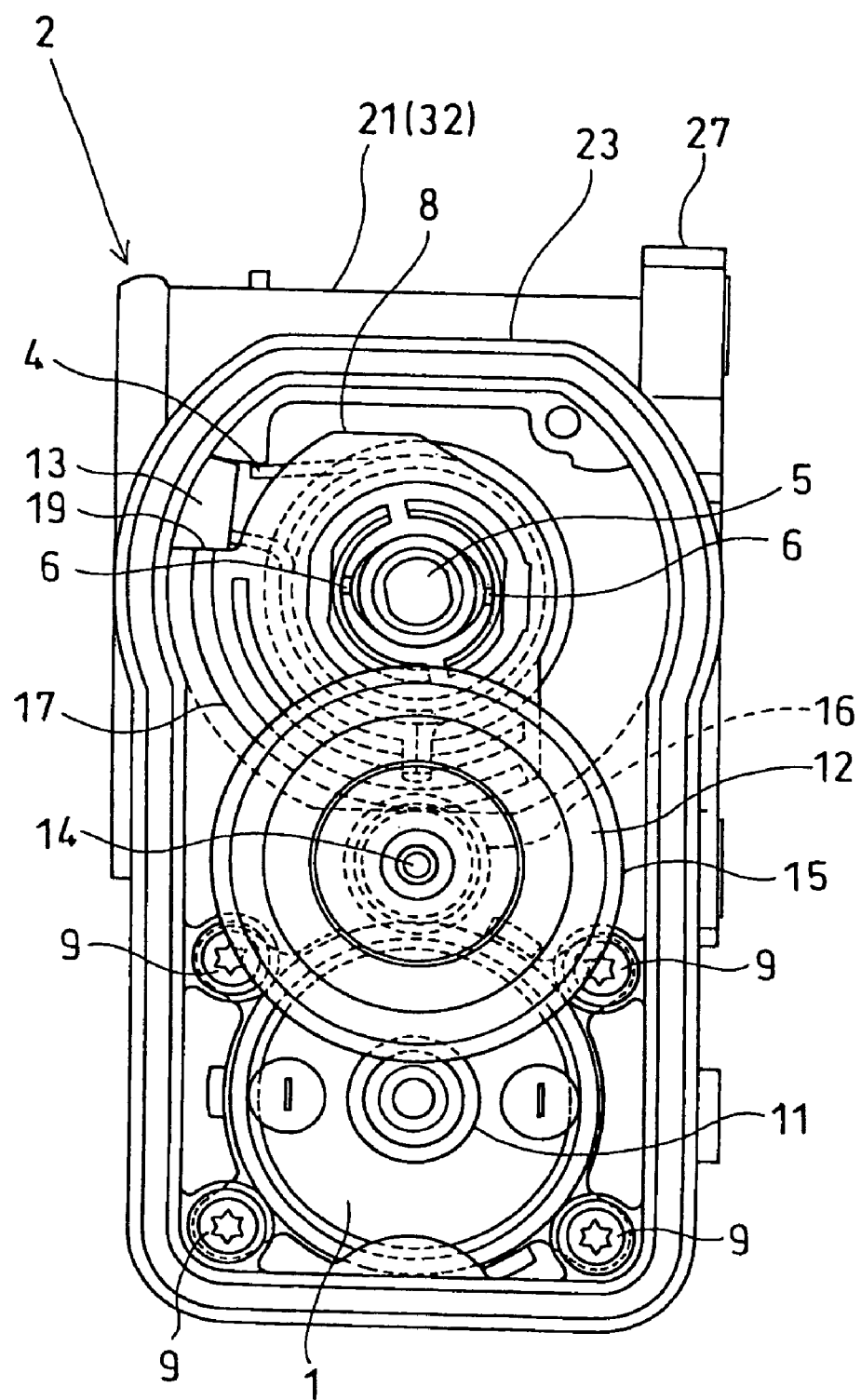
FIG. 3 is a front view showing an inside of a gearbox according to the first embodiment.
Figure 4:
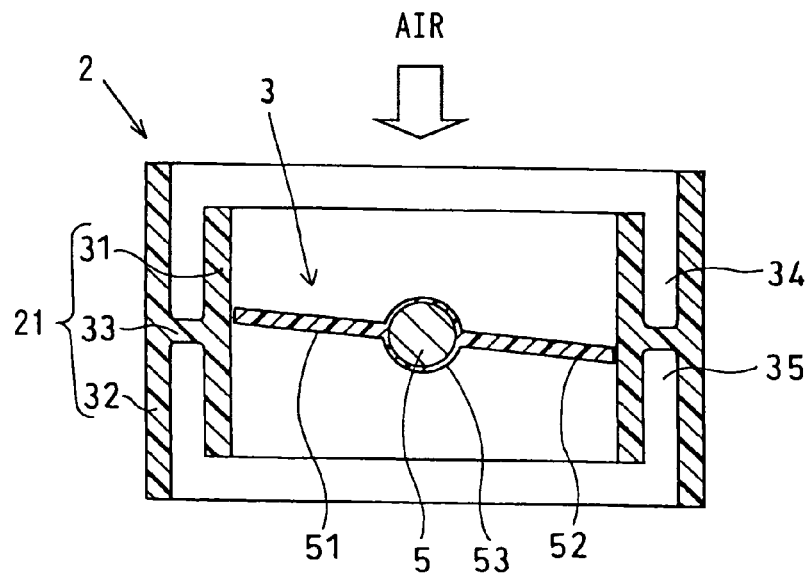
FIG. 4 is a cross sectional view of a double-piped bore wall according to the first embodiment.

Referring to FIG. 2, the bore inner pipe 31 and the bore outer pipe 32 has the substantially cylindrical first valve bearing 41 and the substantially cylindrical second valve bearing (not shown) that are integrally molded of a resinous material. The first valve bearing 41 rotatably supports the first bearing sliding part of the metal shaft 5. The second valve bearing rotatably supports the second bearing sliding part of the metal shaft 5. A circular-shaped first shaft hole 41a is formed in the first valve bearing 41, and a circular-shaped second shaft hole (not shown) is formed in the second valve bearing. A plug (not shown) is provided on the first valve bearing 41 for plugging the opening side of the first valve bearing 41. The second valve bearing is integrally molded with the bore wall part 21, i.e., bottom wall of the gearbox part 22 of the throttle body 2, to be protruded in the right direction in FIG. 2. The outer periphery of the second valve bearing serves as a spring inner periphery guide (not shown) for supporting the diametrically inner periphery of the coil spring 4.

Figure 5A:
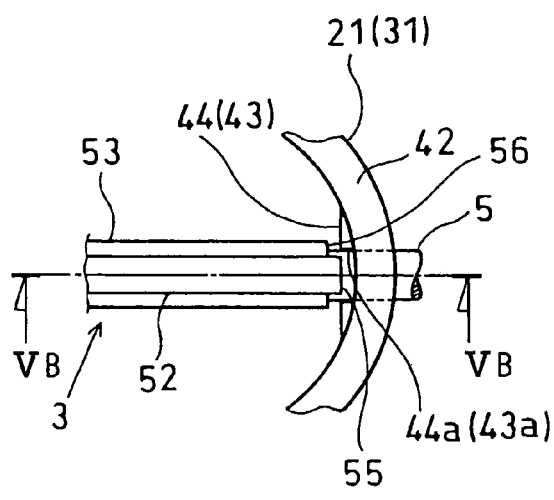
FIG. 5A is a partial view showing an arrangement of the throttle valve and the throttle body according to the first embodiment.
Figure 5B:
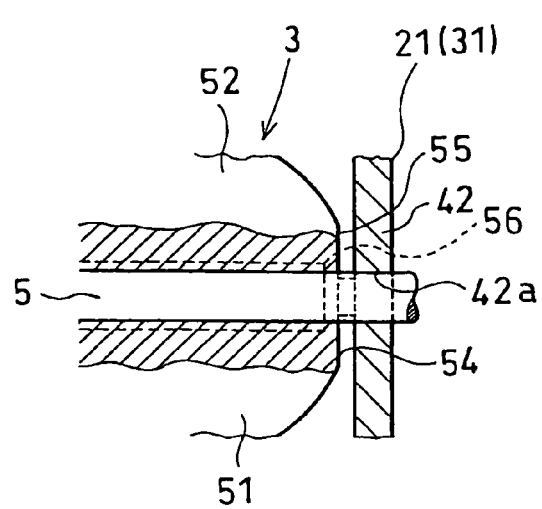
FIG. 5B is a cross sectional view along the line VB—VB of FIG. 5A.
Figure 6A:
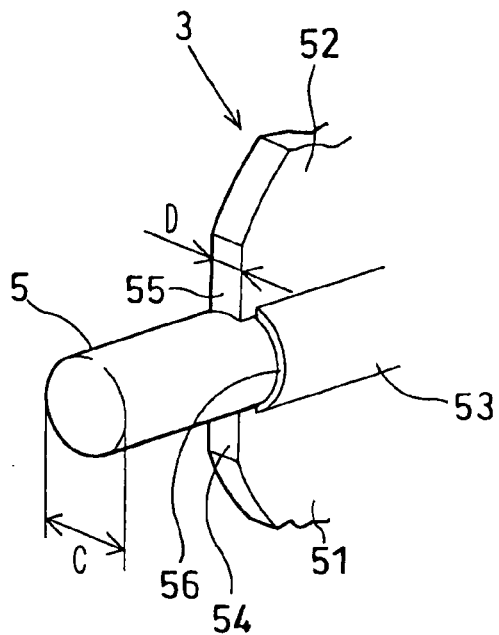
FIG. 6A is a partial view of an axial side of a throttle valve.
Figure 6B:
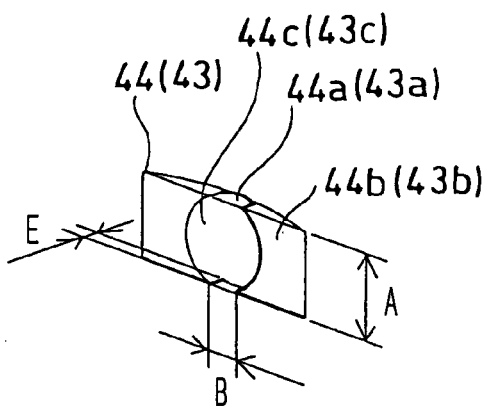
FIG. 6B is a perspective view of body joint.
Figure 7:
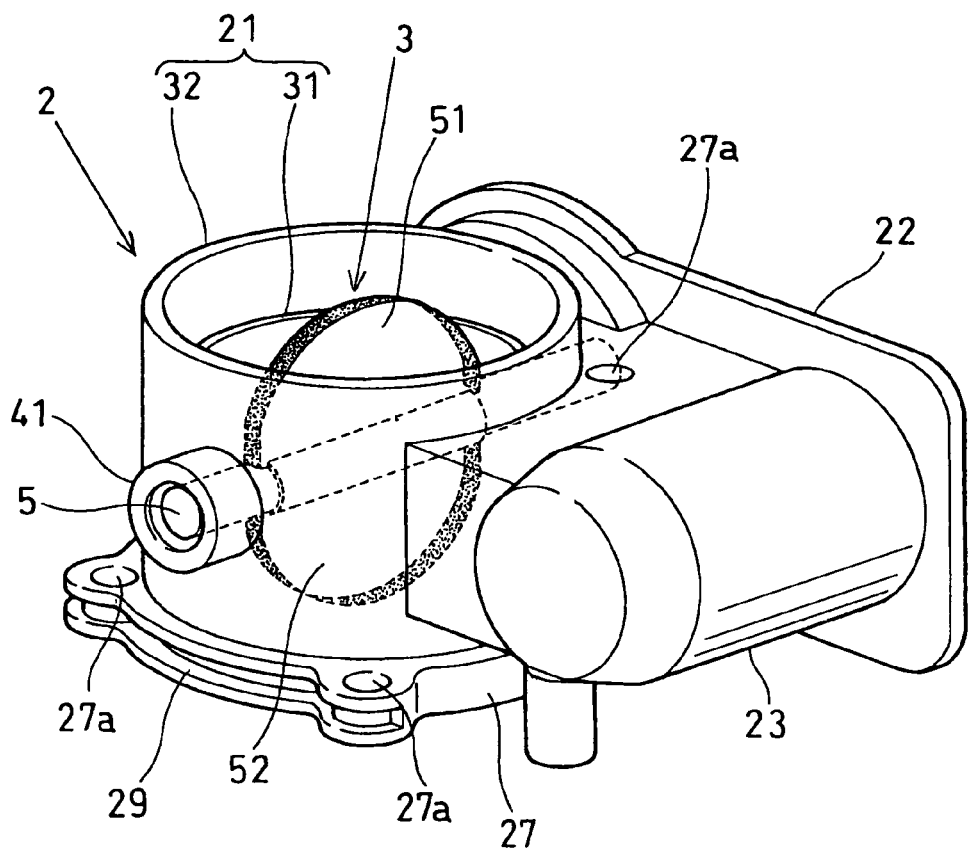
FIG. 7 is a perspective view of a throttle apparatus for explaining a parting line according to the first embodiment.

As shown in FIGS. 5 to 7, the throttle body 2 includes a first body joint 43. The first body joint 43 is insert-molded in the throttle body 2 at a vicinity of the first valve bearing 41 of the bore wall 21, that is, at a vicinity of a first shaft hole 41a of the bore inner pipe 31. The first body joint 43 has a first groove 43a which is opened in parallel to a radial direction of the boar wall 21. A second body joint 44 is insert-molded in the throttle body 2 at the second valve bearing. The second body joint 44 has the same shape as the first body joint 43. The first and the second body joints 43, 44 are made of a material which is not melt and mixed to the resin material of the throttle valve 3 and the throttle body 2, or a material which has no adhesiveness, such as brass, oil-less metal and cupper.

The first and the second body joints 43, 44 have a first flat seal surfaces 43b, 44b in order to seal between the inner surface of the bore inner pipe 31 and an axial end surface of the throttle valve 3 when the throttle valve 3 is fully closed. The first and the second body joints 43, 44 have a first and a second shaft hole 43c, 44c for supporting a first and a second ends of the metal shaft 5. When the throttle valve 3 is fully closed, the first and the second flat seal surfaces 43b, 44b confront a first and a second flat surface 54, 55 in a predetermined clearance.

The first and the second shaft hole 43c, 44c are opened at positions which confront the annular connecting part 33. The first and the second shaft holes 43c, 44c communicate the upstream of the first and the second groove 43a, 44a, with the downstream thereof. The first and the second shaft holes 43c, 44c have the same diameter as the first and the second shaft hole 41a, 42a, and are formed coaxially with respect to the first and the second shaft hole 41a, 42a.

The coil spring 4 is provided on the outer peripheral side of the metal shaft 5. One end part of the coil spring 4 is supported by a body side hook (not shown) provided on the outer wall of the bore wall part 21, i.e., bottom wall of the gearbox part 22. The other end part of the coil spring 4 is supported by a gear side hook (not shown) provided on a plane of the valve gear 8 that is located on the side of the bore wall part 21.

The throttle valve 3 is a butterfly valve of which axis is substantially orthogonal to the center axis of the bore wall part 21. The opening position of the throttle valve is varied from a full-opening position to a full-closing position to control the air amount which is introduced into the engine. The throttle valve 3 is comprised of a first semicircle plate 51, a second semicircle plate 52, a cylindrical resin shaft 53, and the metal shaft 5. The first and the second semicircle plates 51, 52 are made of a thermoplastic synthetic resin, such as PPS, PA, PP, and PEI. When the first and the second semicircle plates 51, 52 are fixed on the cylindrical resin shaft 53, the first and the second semicircle plates 51, 52 form a resin disc.

When the throttle valve 3 is in the full-opening position, the first semicircle plate 51 is positioned upper side of the bore wall part 21 and the second semicircle plate 52 is positioned lower side of the bore wall part 21 with respect to the resin shaft 53. The first and the second semicircle plate 52 are provided with stiffening ribs on the one side or both sides thereof. The resin shaft 53 is integrally molded with the metal shaft 5, by which the throttle valve 3 and the metal shaft 5 are integrated to rotate together.

The metal shaft 5 is a throttle shaft made of a metallic material such as brass or stainless steel to be in a round-bar shape. The axis of the metal shaft 5 is arranged to be in a direction substantially perpendicular to a central axis of the bore wall part 21 of the throttle body 2, and is arranged to be in a direction substantially parallel to the central axis of a motor housing part 23. In this embodiment, the metal shaft 5 has a valve supporting portion for supporting the resinous shaft 53. The metallic valve supporting portion is insert molded inside of the resin shaft part 53 to reinforce the first and the second semicircle plates 51, 52 and the resin shaft 53.

One end portion of the metal shaft 5 on the left side end in FIG. 2 exposes (protrudes) from one end face of the resin shaft 53 in order to serve as a first bearing sliding part that rotatably slides in the first valve bearing 41. The other end side of the throttle shaft on the right side end in FIG. 2 exposes (protrudes) from the other end face of the resin shaft 53 in order to serve as a second bearing sliding part that rotatably slides in a second valve bearing (not shown) of the bore wall part 21. The valve gear 8 constructing the reduction gears is integrally provided on the other end portion of the metal shaft 5 on the right side end in FIG. 2.

AS shown in FIGS. 5 to 7, the throttle valve 3 has the first flat surface 54 and the second flat surface 55 at the axial ends of the first semicircle plate 51 and the second semicircle plate 52. The first flat surface 54 and the second flat surface 55 extend in the axial direction of the boar wall 21. The throttle valve 3 has arc end surfaces 56 at both end of the resin shaft 53. A predetermined distance is made between the first and the second flat surface 55, 56 and the arc end surfaces 56. Thereby, a thin die is needed for a certain restricted area where is between the inner surface of the bore inner pipe 31 and the axial ends of the throttle valve 3. Only the certain restricted area needs the thin die and the remaining other potions of the throttle valve 3 and the throttle body 2 need a normal thick die.

Figure 8:
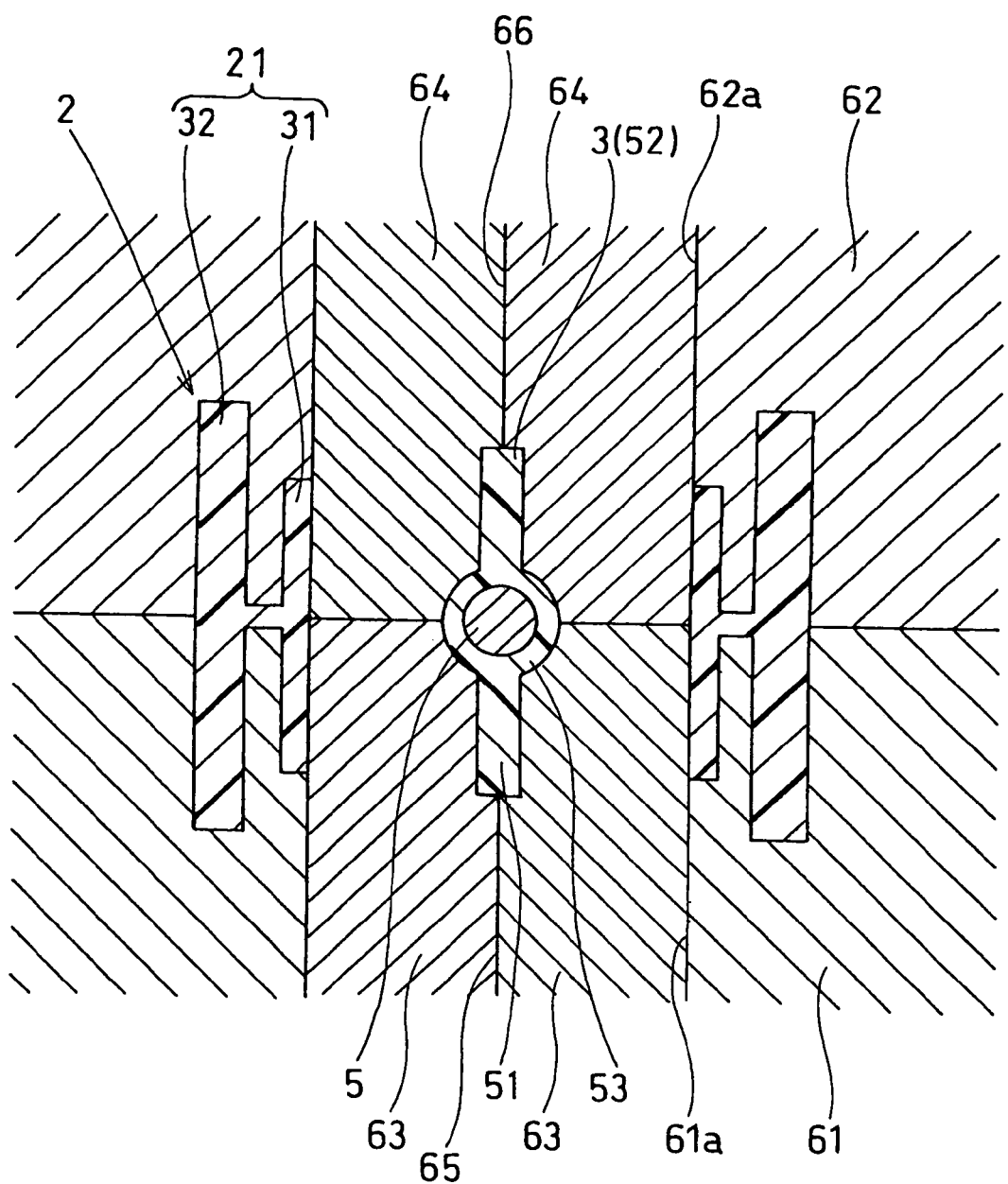
FIG. 8 is a cross sectional view of the molding dies according to the first embodiment.
Figure 9:
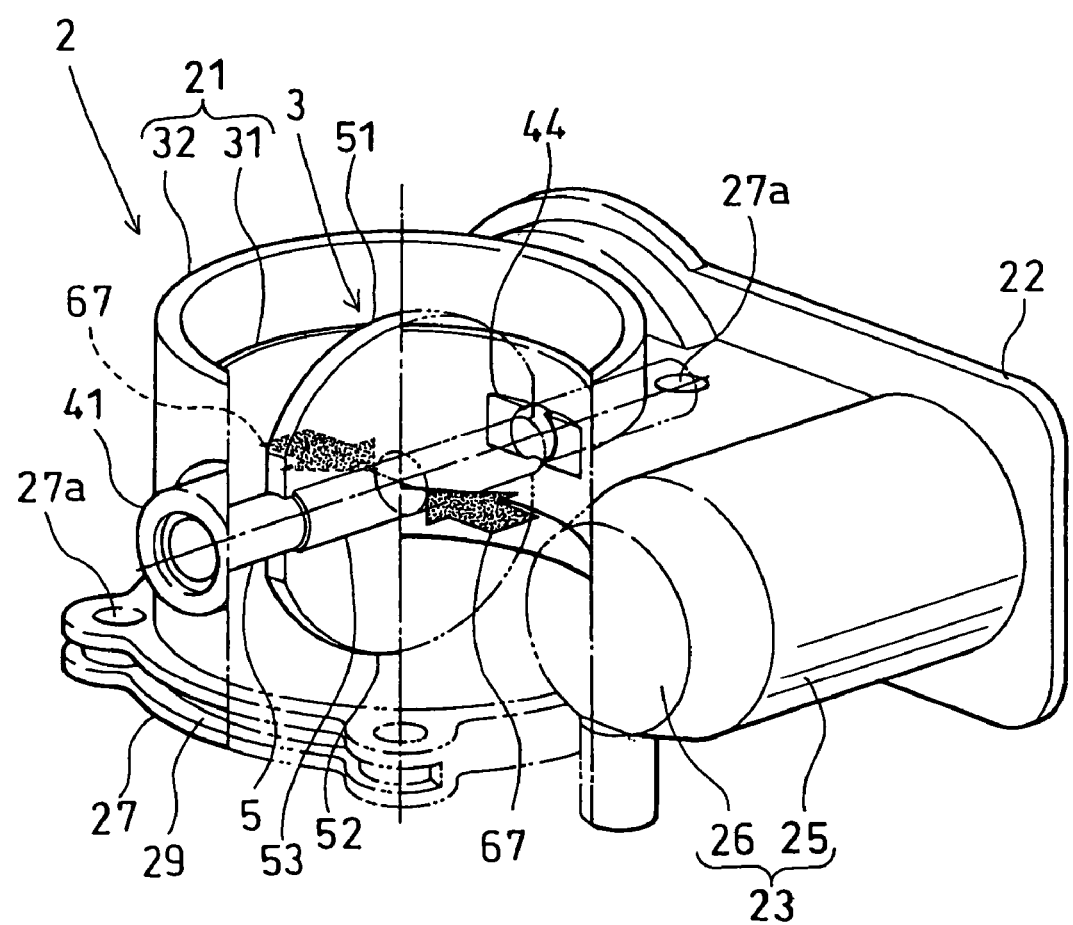
FIG. 9 is a cross sectional view of the molding dies for explaining a position of a pair of valve gate according to the second embodiment.
Figure 10:
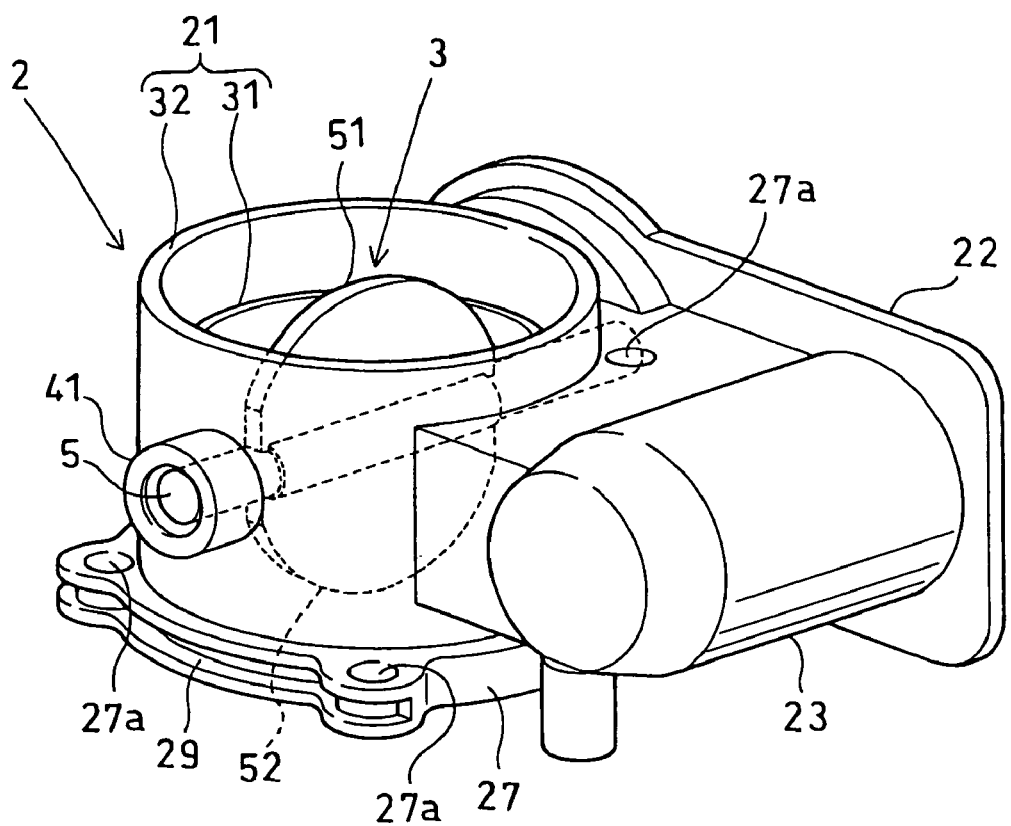
FIG. 10 is a perspective view of a molding product according to the first embodiment.

Referring to FIGS. 1 to 10, the forming method of the throttle apparatus is described hereinafter. FIG. 7 is perspective view of the throttle apparatus which shows the area in which a parting line of insert dies exists. FIG. 8 is a schematic cross sectional view of the dies. FIG. 9 is a perspective view of the throttle apparatus for explaining positions of valve gates. FIG. 10 is a perspective view of the resin product, which is the throttle apparatus.

As shown in FIGS. 1 and 8, the molding dies include a fixed die 61 and a movable die 62 which can move forward and backward relative to the fixed die 61. The fixed die 61 includes two-part split insert dies 63, which is referred to as first insert dies hereinafter, and the movable die 62 includes two-part split insert dies 64, which is referred to as second insert dies hereinafter. The movable die 62 also includes a slide core (movable insert die: not shown) which forms an undercut portion 29 in the stay 27. The stay 27 is formed at the end of the bore outer pipe 32. Both of the two-part insert die 63, 64 are symmetrically shaped with respect to the centerline of the bore wall part 21 of the throttle body 2. As shown in FIG. 8, the parting line of the fixed die 61 and the movable die 62 is positioned on the rotational axis of the throttle valve 3.

The first insert dies 63 are inserted into an insert hole 61a to be fixed in the fixed die 61 with a screw (not shown). The first insert dies 63 have a first split line 65, which corresponds to a first gas purge hole or a first gas vent in the present invention. The first split line 65 extends from the radial end of the first semi-circle plate 51 to outer surface of the fixed die 61.

The second insert dies 64 are inserted into an insert hole 62a to be fixed in the movable die 62 with a screw (not shown). The second insert dies 64 have a second split line 66, which corresponds to a second gas purge hole or a second gas vent in the present invention. The second split line 66 extends from the radial end of the second semi-circle plate 52 to outer surface of the movable die 62.

As illustrate in FIG. 8, a phantom line connecting the first split line 65 and the second split lines 66 is on the centerline of the bore wall part 21. A parting line of the first insert dies 63 and the second insert dies 64 are positioned on the rotational axis of the throttle valve 3.

A body cavity of which shape corresponds to the bore wall 21 is formed between the fixed die 61, the movable die 62, the first insert dies 63 and the second insert dies 64. The body cavity comprises a first body cavity corresponding to the bore wall part 21, a second body cavity corresponding to the gearbox part 22, and a third body cavity corresponding to the motor housing 23 and the connecting portion 24.

When the dies are clamped, a valve cavity is formed between the first split die 63 and the second split die 64. As illustrated in FIG. 1, the valve cavity comprises a first valve cavity 71 corresponding to the first semi-circle plate 51 and a second valve cavity 72 corresponding to the second semi-circle plate 52. The first valve cavity 71 includes a first shaft cavity 71a corresponding to the under half of the resin shaft 53. The second valve cavity 72 includes a second shaft cavity 72a corresponding to the upper half of the resin shaft 53.

The metal shaft 5 functions as a first and a second supported portions which are supported by the first bearing 41 and the second bearing 42. The bore wall 21 functions as a valve holding portion which holds the resin shaft 53 of the throttle valve 3. When the throttle body 2 and the throttle valve 3 is substantially simultaneously molded in the same dies, the first and the second shaft holding portions 68, 69 hold the both ends of the metal shaft 5, the first and the second shaft holding portion 68, 69 being respectively provided in the first split die 63 and the second split die 64. Thus, the metal shaft 5 is insert-molded in the resin shaft 53. The first and the second joints 43, 44 are also held by the first and the second joint holding portions in such a manner that the first and the second joints 43, 44 are insert-molded at the vicinity of the first and the second shaft hole 41a, 42a.

The first body cavity to the third body cavity are communicated with each other. The first and the second valve cavities 71, 72 are isolated from the first to the third body cavities by the fixed die 61 and the movable die 62.

The first to the third body cavities and the first and second valve cavities 71, 72 are connected with a resin material supplying apparatus (not shown). The resin material supplying apparatus includes single or multiple body gates (a first gate) at ends of a resin passage (not shown) through which a melted resin such as PPS and PBT is injected into the first to the third body cavities. The resin material supplying apparatus includes a pair of valve gates 67 (a second gate) at ends of the resin passage through which a melted resin such as PPS and PBT is injected into the first valve cavity 71 and the second valve cavity 72.

Single or multiple body gates can be positioned at the bore wall 21 or the motor housing 23. As shown in FIG. 9, each of the valve gates illustrated by arrows 67 is confronting each other from opposite direction with respect to the resin shaft 53 and the metal shaft 5. Thus, melted resin can easily flow into the whole of valve cavity 66.

The first split line 65 and the second split line 66 are utilized as a first gas purge hole and a second gas purge hole through which the gas in the first and the second valve cavity 71, 72 is purged. In this embodiment, the first split line 65 is opened to atmosphere at the lower end thereof, and the second split line 66 is opened to atmosphere at the upper end thereof.

When the widths of the first and the second split lines 64, 65 are less than or equal to 5 µm, the gas is hardly purged enough. When the width of the first and the second split lines 64, 65 are larger than or equal to 25 µm, the resin product may have burrs. An appropriate range of the widths of the first split line 65 and the second split line 64 is 10 to 20 µm. The first split die 63 and the second split die 64 may have a gas vent, which comprises a concave groove, on the parting lines thereof. In this configuration, each of two pieces of the first split die 63 and the second split die 64 are always clamped so that the gas vent is hardly collapsed even after the molding dies are opened or clamped many times.

In order to form the throttle valve 3 and the throttle body 2 simultaneously in the same die, the first to the third body cavity and the first and the second valve cavities 71, 72 are formed in such a manner that the molded throttle valve 3 is positioned in the full-opening position as shown in FIG. 10.

The movable die 62 having the second split die moves toward the fixed die 61 to form the first to the third body cavities and the valve cavities 71, 72 therebetween. The melted resin, such as PPS and PBT, is injected into the first to the third body cavities and the first and the second valve cavities 71, 72 through the body gate and the valve gates 67. The first and the second shaft holding portions 68 69, which are provided in the first insert die 63 and the second insert die 64 dies, hold the metal shaft 5 in such a manner that the both ends of the metal shaft 5 is positioned in the first to the third body cavities and the first and the second valve cavities 71, 72. The first and the second joint holding portions hold the first and the second joints 43 44 in the first to the third body cavity. Two arrows in FIG. 9 represent a flow direction of the melted resin flowing from the valve gates 67 into the valve cavity 66.

The inner pressure of the cavities, which is a pressure of the resin in the first to the third body cavities and the first and the second valve cavities 71, 72, is gradually increased, and the holding pressure which is higher than the maximum pressure of the injection pressure is maintained in the cavities for a predetermined period.

The resin material injected into the cavities contains low molecular weight components, such as a mold release, an antioxidant, and a non-reacted monomer. Because the melted resin is kept under a high pressure in the resin material supplying apparatus, the low molecular weight components are held in the melted resin. When the resin material is injected into the first and the second valve cavities 71, 72 through the valve gates 67 to be in a low pressure, the low molecular weight components evaporates from the melted resin to be changed into the gas. The first and the second valve cavities 71, 72 are filled with the melted resin and the gas.

According as the resin material is injected into the cavities, the remaining air, which exists in the first and the second valve cavities 71, 72 before the injection of the resin, is compressed in the first and the second valve cavities 71, 72. Then, the air and the gas are forced to the downstream of the injected resin, so that the air and the gas are expelled from the valve cavities 71, 72 through the first split line 65 and the second split line 66. The first split line 65 and the second split line 66 function as the gas vents.

The injected resin in the cavities is cooled by a cooling water to be solidified. The cooling water circulates in the dies. After the resin in the dies is solidified in such manner that the throttle valve 3 can rotate in the throttle body 2, the resin molding product shown in FIG. 10 is ejected from the dies. The metal shaft 5 is insert-molded in the resin shaft 53, and the first and the second body joints 43, 44 are also insert-molded in the bore inner pipe 31.

As follows, an operation of the electrically controlled throttle apparatus is described. When the driver steps the accelerator pedal of the vehicle, the accelerator position signal, which is transmitted from the accelerator position sensor to the ECU, changes. The ECU controls electric power supplied to the driving motor 1, so that the motor shaft of the driving motor 1 is rotated and the throttle valve 3 is operated to be in a predetermined position. The torque of the driving motor 1 is transmitted to the valve gear 8 via the pinion gear 11 and the middle reduction gear 12. Thus, the valve gear 8 rotates by a rotation angle corresponding to the stepping degree of the accelerator pedal, against urging force generated by the coil spring 4.

Therefore, the valve gear 8 rotates, and the metal shaft 5 also rotates by the same angle as the rotation angle of the valve gear 8, so that the throttle valve 3 rotates from its full close position toward its full open position. As a result, the air intake passage formed in the bore inner pipe 31 of the bore wall part 21 of the throttle body 2 is opened by a predetermined degree, so that rotation speed of the engine is changed to be a rotation speed corresponding to the stepping degree of the accelerator pedal by the driver.

When the driver releases the accelerator pedal, the throttle valve 3, the metal shaft 5, and the valve gear 8 return to an initial position of the throttle valve 3 by urging force of the coil spring 4. The initial position of the throttle valve 3 is an idling position or the full close position. When the driver releases the accelerator pedal, the value of the accelerator position signal transmitted by the accelerator position sensor becomes substantially 0%. Therefore, in this situation, the ECU can supply electric power to the driving motor 1 in order to rotate the motor shaft of the driving motor 1 in its reverse direction, so that the throttle valve 3 is controlled at its full close position. In this case, the throttle valve 3 can be rotated in the close direction by the driving motor 1. The throttle valve 3 rotates in the close direction by urging force of the coil spring 4 until the full-close stopper portion 19 provided on the valve gear 8 contacts the full-close stopper 13 integrally molded on the inner wall of the gearbox part 22 of the throttle body 2. Here, the close direction is a direction, in which the throttle valve 3 closes the air intake passage by rotating from the full open position to the full close position. Rotation of the throttle valve 3 is restricted by the full-close stopper 19 at the full close position of the throttle valve 3. Therefore, the throttle valve 3 is maintained in the predetermined full close position, i.e., idling position, in the air intake passage formed in the bore inner pipe 31. Thus, the air intake passage connected to the engine is substantially closed, so that rotation speed of the engine is set at a predetermined idling speed.

In the present embodiment, the throttle body 2 and the throttle valve 3 is integrally molded of the resin in such a manner that the throttle valve 3 is in full opened position in order that the throttle valve 3 can rotate in the bore inner pipe 31.

Figure 16:
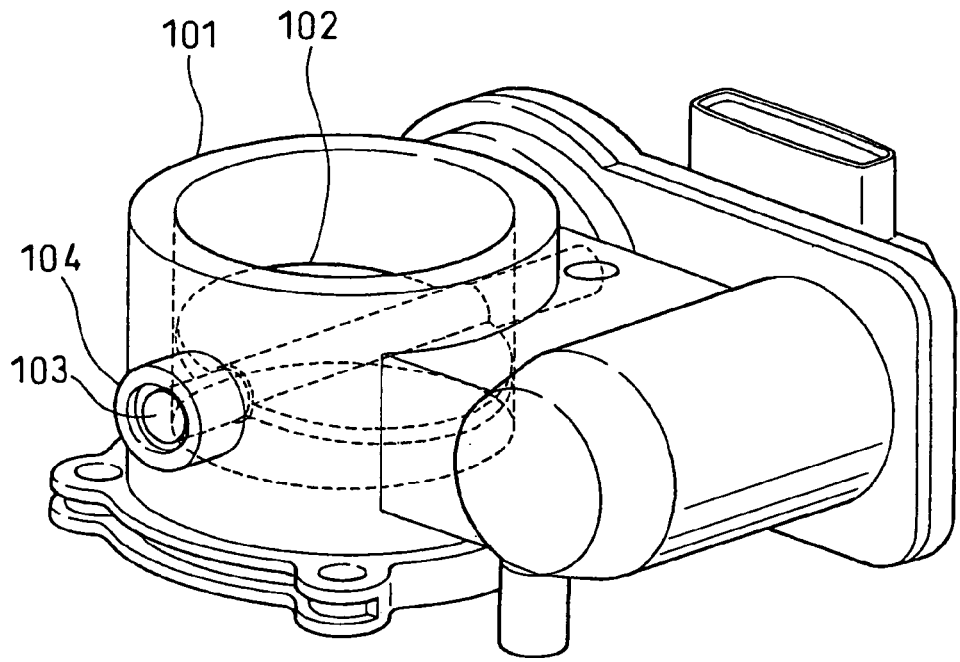
FIG. 16 is a perspective view of a conventional throttle apparatus.
Figure 17:
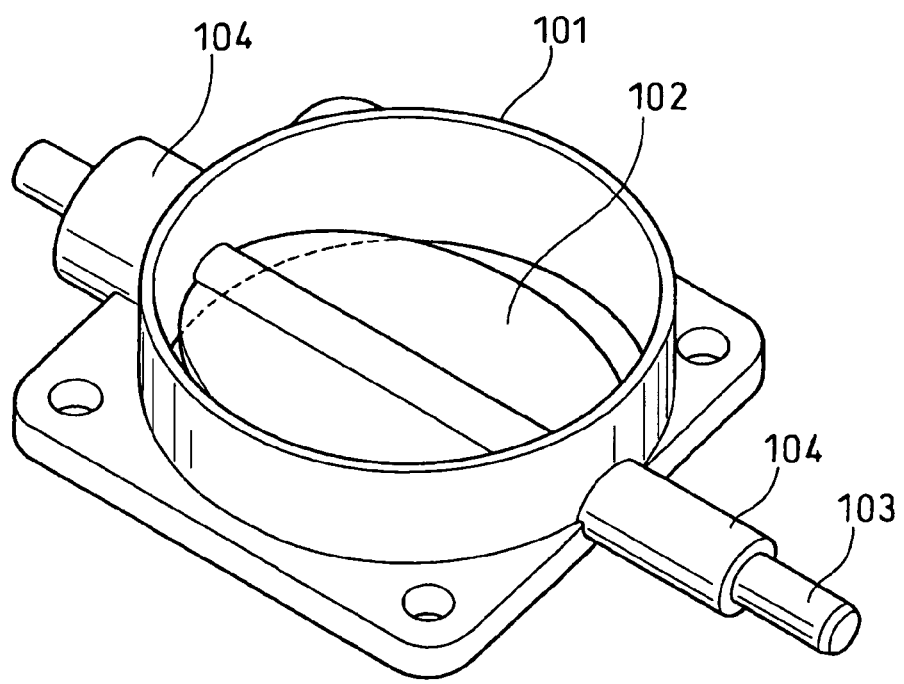
FIG. 17 is a perspective view of a conventional throttle apparatus of which the throttle valve is molded in the throttle body.
Figure 18:
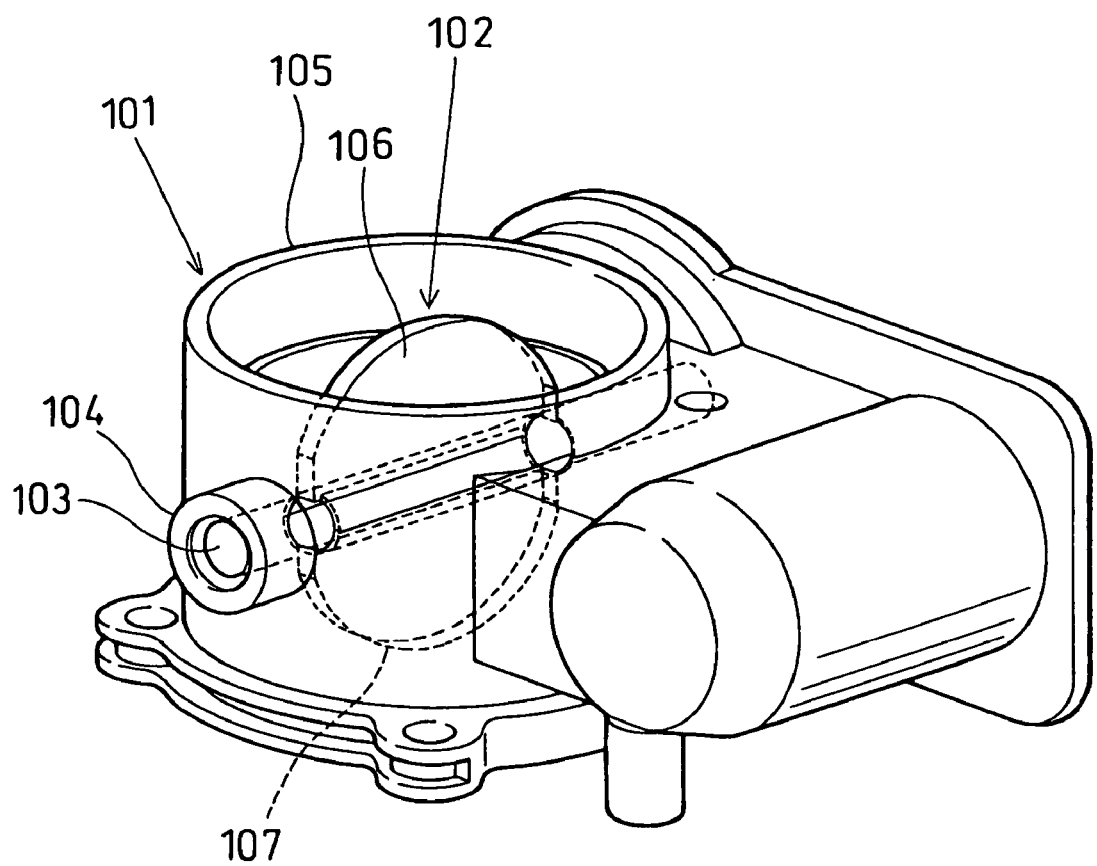
FIG. 18 is a perspective view of a resin product according to a comparative example.
Figure 19:
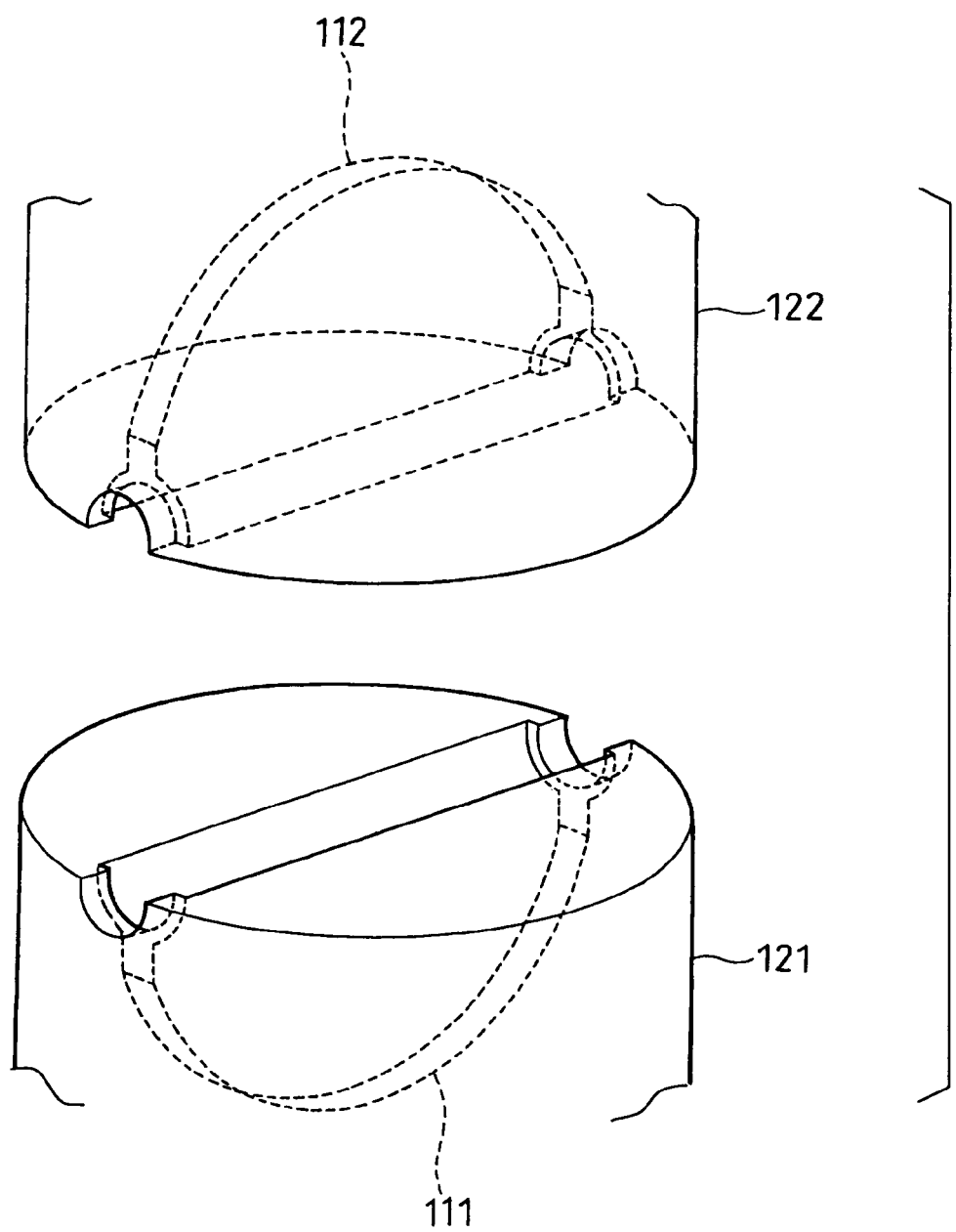
FIG. 19 is a perspective view of a first insert die and a second insert die according to a comparative example.
Figure 20:
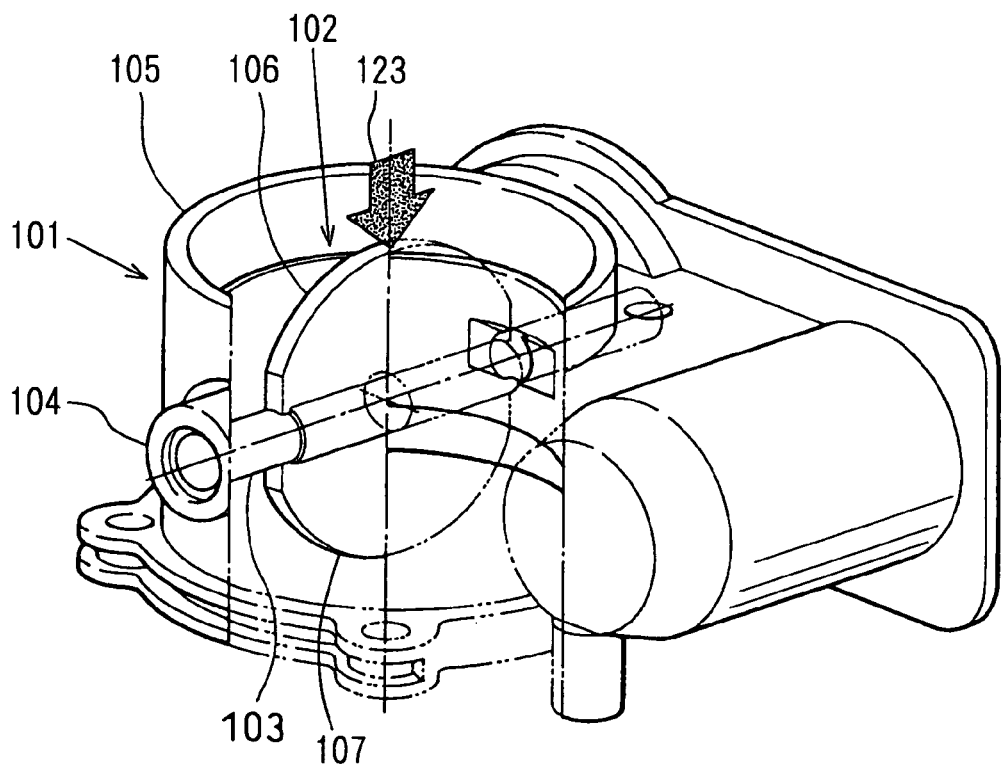
FIG. 20 is a perspective view of a throttle apparatus according to a comparative example.
Figure 21:
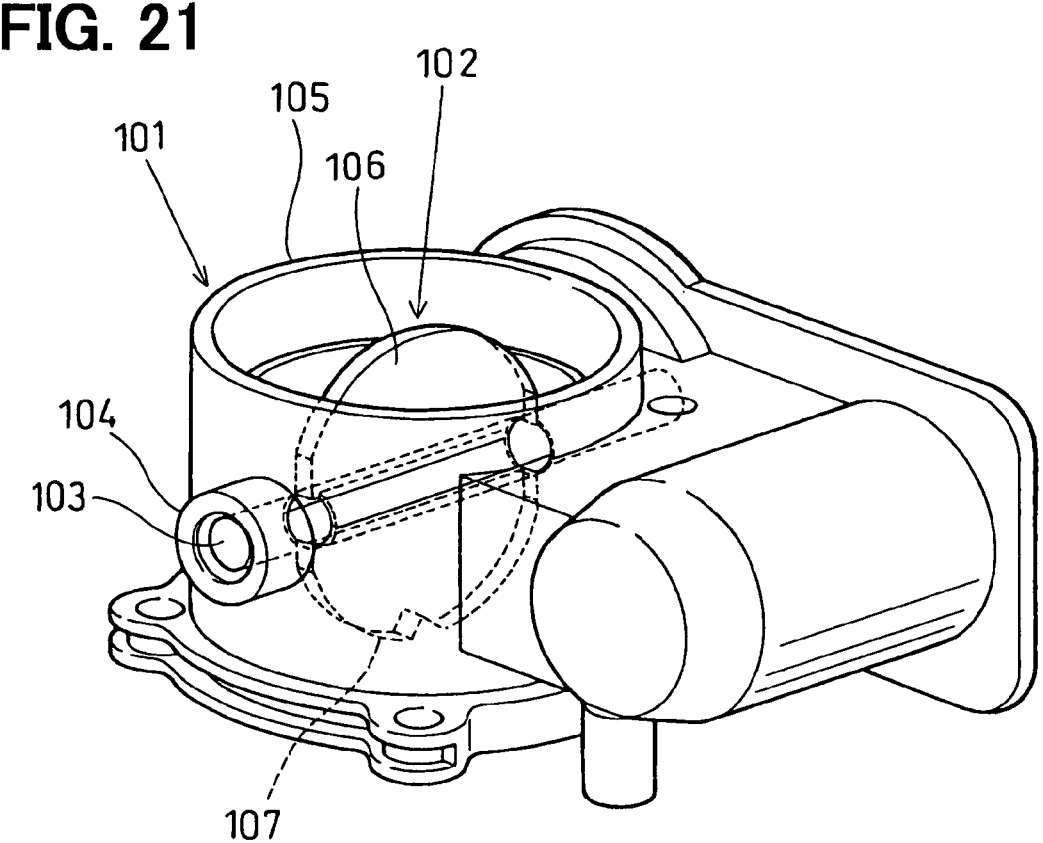
FIG. 21 is a perspective view of a throttle apparatus for explaining a shortshot.
Figure 22:
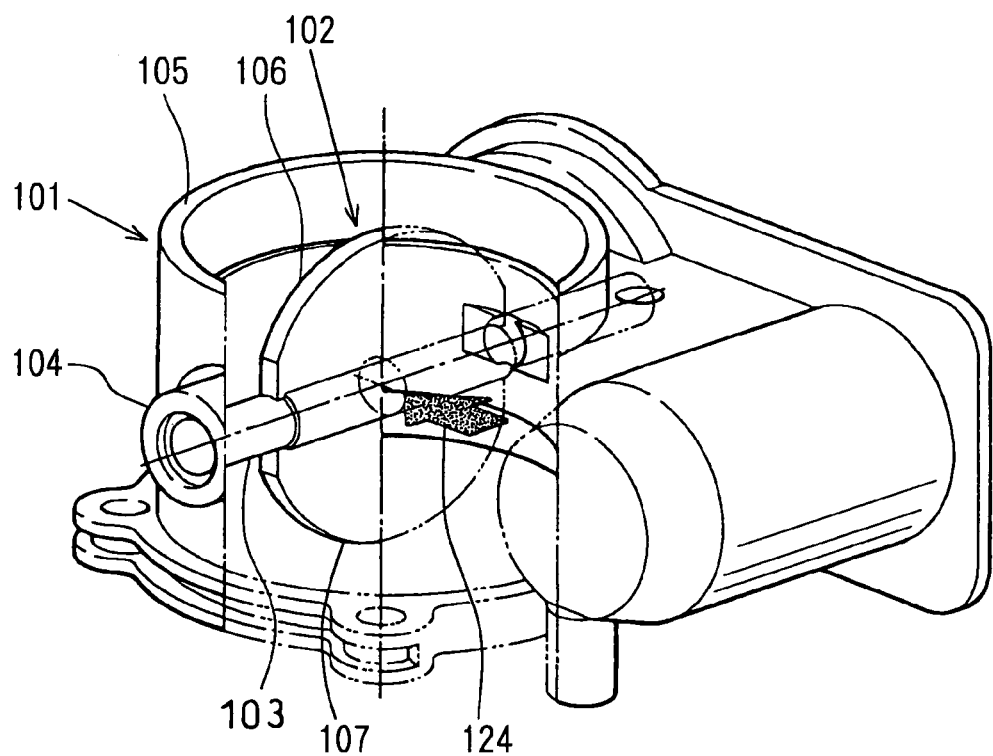
FIG. 22 is a perspective view of the throttle apparatus for explaining a position of a valve gate according to a comparative example.
Figure 23:
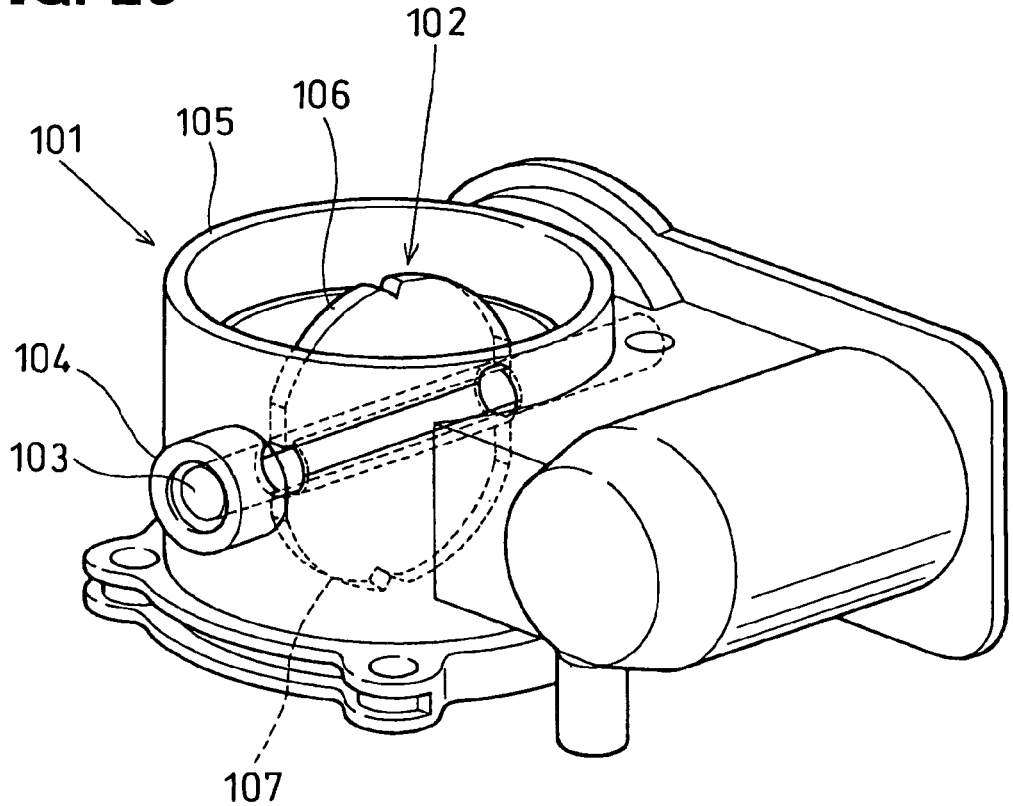
FIG. 23 is a perspective view of a throttle apparatus for explaining a shortshot.

In the conventional molding dies for forming the throttle apparatus shown in FIG. 16, a thin cylindrical die is needed to form a clearance between the throttle body 101 and the throttle valve 102, so that the cost of the dies and production cost are increased. However, in the present embodiment, the molding dies are needed to form the inner surface of the bore inner pipe 31 and both outer ends of the axis of the throttle valve 3. In other words, the inner surface of the bore inner pipe 31 at the vicinity of the first and the second bearings 41, 42 is isolated from both ends of the axis of the throttle valve 3 by the first and the second shaft holding portions 68, 69 of the first and the second insert die 63, 64, and both ends of the metal shaft 5. Therefore, the throttle valve 3 and the throttle body 2 are molded as shown in FIG. 10 at the same time in the same dies without increasing production cost.

Furthermore, the inner surface of the bore inner pipe 31 and the both ends of metal shaft 5 are isolated from each other. The first to the third body cavities and the first and the second valve cavity 71, 72 are isolated enough to maintain the clearance between the inner surface of the bore inner pipe 31 and the outer surface of the throttle valve 3 in a proper value, by which the product function is not deteriorated. That is, the throttle valve 3 can rotate in the bore inner pipe 31 without any interference there between. The throttle valve 3 and the metal shaft 5 are hardly stuck. When the throttle valve 3 is fully closed, the air tightness of the throttle valve 3 is not deteriorated.

The first and the second body joints 43, 44 have the first and the second grooves 43a, 44a which are contact with the first and the second flat surfaces 54, 55 respectively. Thus, the first and the second shaft holding portions 68, 69 of the first insert die 63 and the second insert die 64 can be disposed between the inner surface of the bore inner pipe 31 and the first and the second flat surfaces 54, 55. Thereby, the durability of the molding dies is enhanced.

In order that the throttle valve 3 and the bore wall 21 are integrally molded, the first and the second flat surfaces 54, 55 are not contact with the inner surface of the bore inner pipe 31. An amount of the clearance between the inner surface of the bore inner pipe 31 and the first and the second flat surfaces 54, 55 is adjustable by means of the first and the second shaft holding portions 68, 69.

As shown in FIGS. 6A and 6B, the diameter of the first and the second shaft hole 43c, 44c is denoted by "A", the width of the first and the second groove 43a, 44a is denoted by "B", the diameter of the metal shaft 5 is denoted by "C", the width of the first and the second surfaces 54, 55 are denoted by "D", and the depth of the first and the second grooves 43a, 44a is denoted by "E".

$$A \leq C \quad (1)$$

$$D \leq B \quad (2)$$

$$0 \leq E \quad (3)$$

When the dimension "A" to "E" satisfy the above formula, the inner surface of the bore inner pipe 31 and the first and the second flat surfaces 55, 56 of the throttle valve 3 are isolated from each other by the first and the second shaft holding portions 68, 69 and the exposed end portions of the metal shaft 15. Therefore, the throttle body 2 and throttle valve 3 can be simultaneously molded in the same die, and the amount of the clearance between the inner surface of the bore inner pipe 31 and the first and the second flat surfaces 54, 55 can be adjustable.

Because the metal shaft 5 is insert-molded in the resin shaft 53 of the throttle valve 3 in the present embodiment, the inner surface of the bore inner pipe 31 and the flat surfaces 55, 56 are isolated from each other by the first and the second shaft holding portions 68, 69 and the exposed end portions of the metal shaft 5 so that the throttle body 2 and the throttle valve 3 can be molded substantially simultaneously in the same molding dies. In this embodiment, the metal shaft 5 functions as the throttle shaft. The throttle shaft of the throttle valve 3 can be made of the other material, such as ceramics. Alternatively, the throttle shaft can be made of resin material.

The gas evaporated from the melted resin and the remaining air in the first and the second valve cavities 71, 72 are expelled from the first and the second cavities 71, 72 to the atmosphere through the first split line 65 and the second split line 66 which function as the gas vent. Therefore, the gas and the air hardly remain in the cavities 71, 72, so that whole of the first and the second cavities 71, 72 are filled with the melted resin. Thereby, the shortshot and the corrosion by the gas hardly happen to reduce the defect of the throttle valve 3 and to reduce the production cost.

The circularity of the throttle valve 3 is also enhanced. Thereby, when the throttle valve 3 is positioned in the full closed position, the clearance between the outer surface of the throttle valve and the inner surface of the throttle body is minimize to obtain the hermeticity. When the engine is at idling, the leak amount of the intake air is reduced to enhance the fuel economy.

Second Embodiment

FIGS. 11 to 14 show a second embodiment of the present invention.

Figure 11:
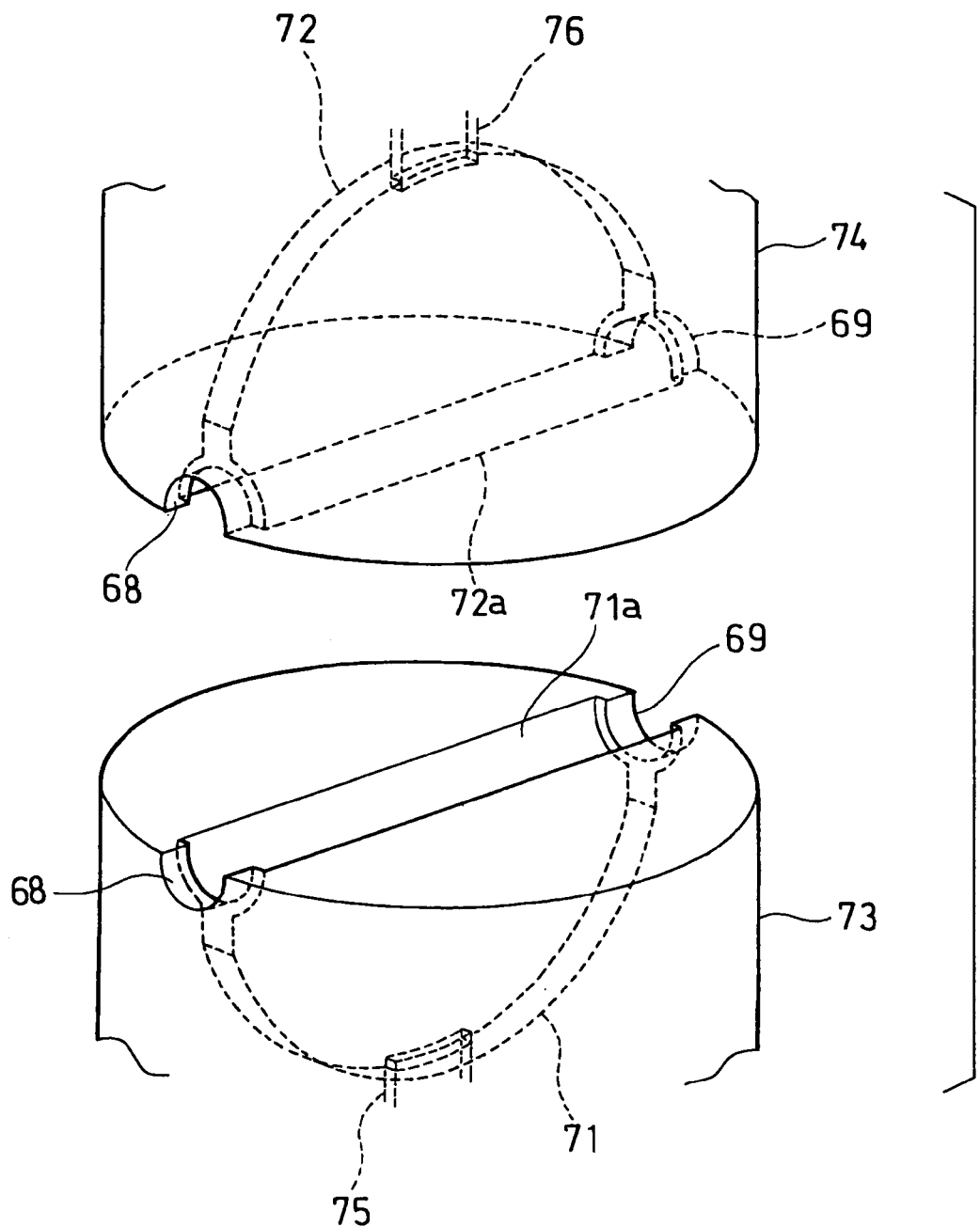
FIG. 11 is a perspective view of a first insert die and a second insert die according to a second embodiment of the present invention.
Figure 12:
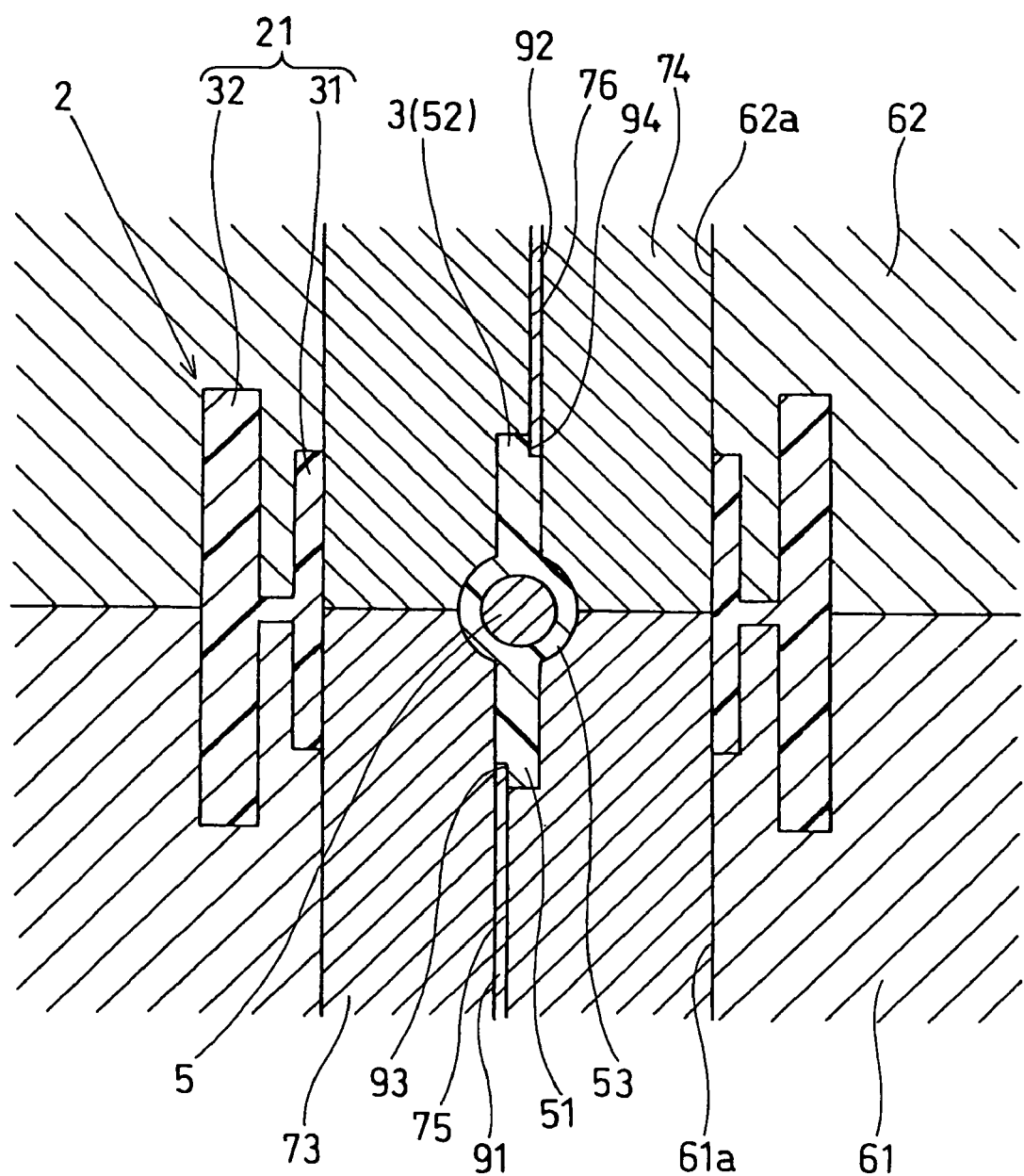
FIG. 12 is a cross sectional view of a molding die according to the second embodiment.
Figure 13:
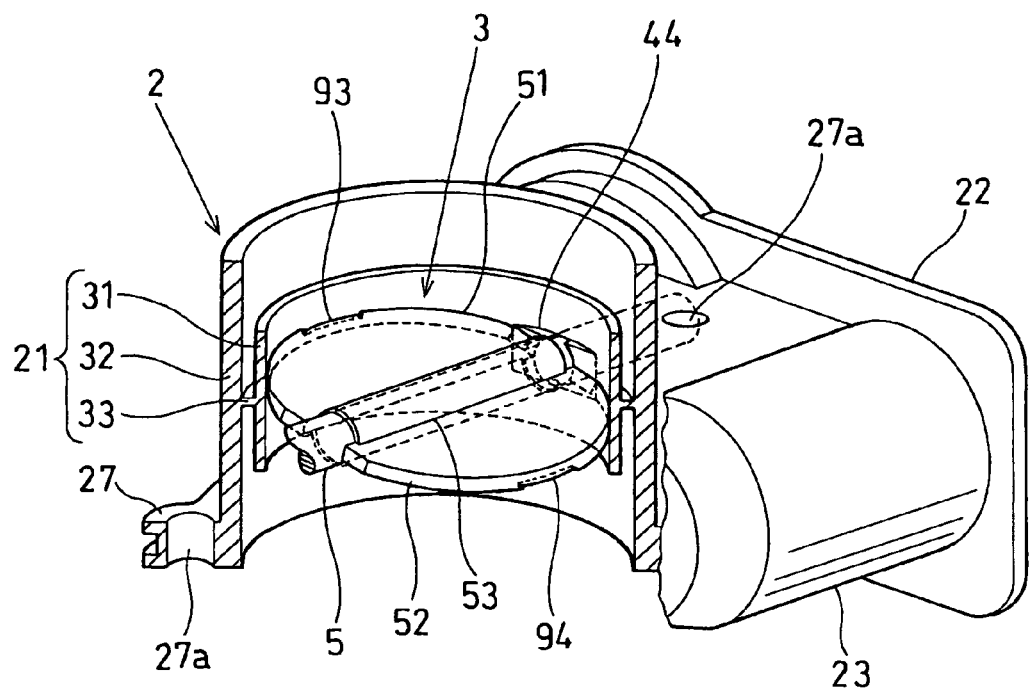
FIG. 13 is a partially cross sectional perspective view of the throttle apparatus for explaining a position of a first and a second engaging grooves according to the second embodiment.
Figure 14A:
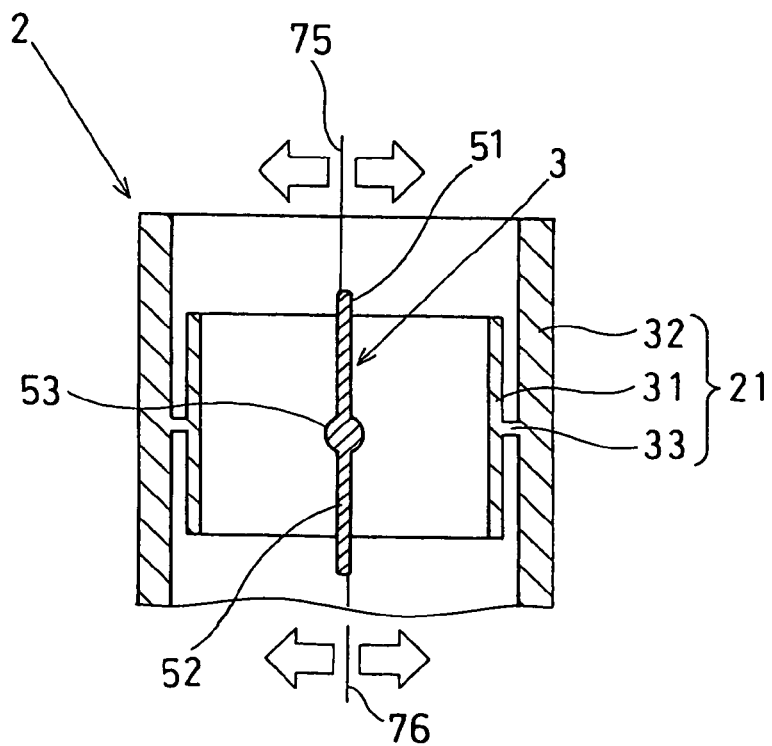
FIGS. 14A and 14B are cross sectional views of the throttle valve for explaining the position of the throttle valve according to the second embodiment.
Figure 14B:
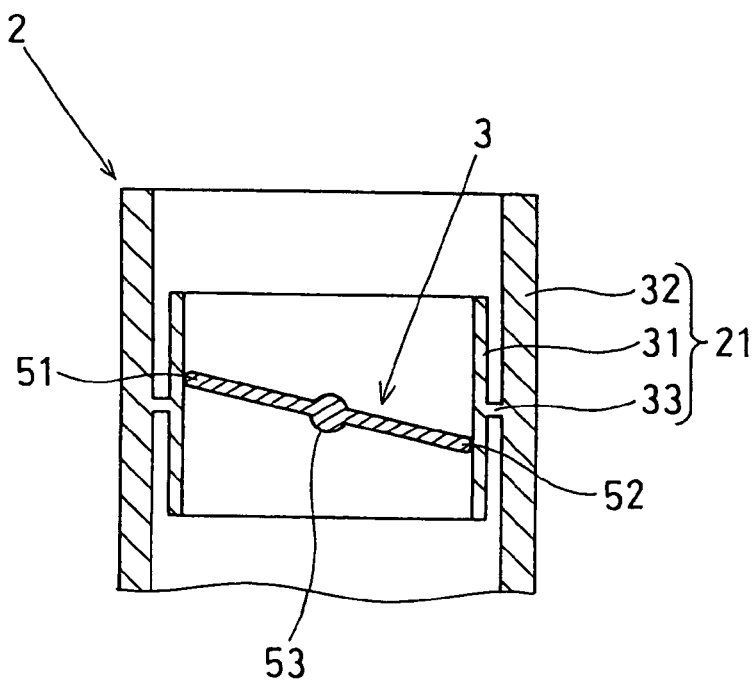

FIG. 11 is a perspective view of insert dies 73, 74. FIG. 12 is across sectional view of a molding dies. FIG. 13 is partially cross sectional perspective view showing a first and a second engaging grooves of the throttle valve. FIG. 14A is cross sectional view of the throttle valve in a full opened position, FIG. 14B is a cross sectional view of the throttle valve in a full closed position.

The molding dies comprises a fixed die 61 and a movable die 62 which is displaced forward and backward relative to the fixed die 61. The fixed die includes a first insert die 73, and the movable die includes a second insert die 74. When the molding dies are closed, the fixed die 61, the movable die 62, the first insert die 73, and the second insert die 74 form a body cavity therebetween, the shape of the body cavity corresponding to the bore wall part 21 of the throttle body 2. As illustrated in FIG. 11, the valve cavity comprises a first valve cavity 71 corresponding to the first semi-circle plate 51, and a second valve cavity 72 corresponding to the second semi-circle plate 52. The first valve cavity 71a includes a first shaft cavity 71a corresponding to the half of the resin shaft 53. The second valve cavity 72 includes a second shaft cavity 72a corresponding to the other half of the resin shaft 53.

The molding dies includes an ejector mechanism which removes a resin mold from the body cavity and the first and the second valve cavity 71, 72 when the movable die 62 moves away from the fixed die 61. The ejector mechanism includes multiple ejector pins, a movable ejector plate (not shown), and a power unit, such as an oil pressure cylinder and an air pressure cylinder.

The ejector pins comprise a plurality of body ejector pins and a second valve ejector pin 92. The body ejector pins protrude into the body cavity when the molding dies are opened. The second valve ejector pin 92 protrudes into the second valve cavity 72 when the molding dies are opened. The body ejector pins are column shaped pins and are slidablly supported in the through hole disposed in the movable die 62. The body ejector pins is contactable with the outer surface of the stay 27.

The second valve ejector pin 92 is flat plate and is slidablly supported in a second through hole 76 (a second gas purge hole, a second gas vent). An end portion of the second valve ejector pin 92 is concaved to be in contact with a second engaging groove 94 of the throttle valve 3, which is shown in FIG. 13. The other end of the second valve ejector pin 92 is connected with the ejector plate as well as the body ejector pins.

A first insert die 73 is provided with a first through hole 75 (a first gas purge hole, a first gas vent) by which a first valve ejector pin 91 is supported. An end portion of the first valve ejector pin 91 is concaved to be in contact with a first engaging groove 93 of the throttle valve 3, which is shown in FIG. 13.

In this embodiment, the clearance between the first valve ejector pin 91 and the first through hole 75, and the clearance between the second valve ejector pin 92 and the second through hole 76 function as the first and the second gas purge hole which are used for purging the gas in the first and the second valve cavities 71, 72 into the atmosphere.

When the value of the above clearance is less than or equal to 5 μm, the gas is hardly purged enough. When the value of the clearance is larger than or equal to 25 μm, the resin product may have burrs. An appropriate range of the value is 10 μm to 20 μm.

The first semi-circle plate 51 of the throttle valve 3 is provided with the first engaging groove 93 on the opposite side surface to the sealing surface of the plate 51. The second semi-circle plate 52 of the throttle valve 3 is provided with the second engaging groove 94 on the opposite side surface to the sealing surface of the plate 52. The first engaging groove 93 receives the end of the first ejector pin 91, and second engaging groove 94 receives the second ejector pin 92 when the molding dies are closed. Therefore each of the clearances which are mentioned above is communicated with the each of the engaging grooves.

The gas evaporated from the melted resin and the remaining air in the first and the second cavities are expelled into the atmosphere through the clearances between the first valve ejector pin 91 and the first through hole 75 and between the second valve ejector pin 92 and the second through hole 76. Therefore, the second embodiment has the same function and effect as the first embodiment.

As illustrated in FIGS. 11 and 12, the first and the second through holes 75, 76 and the first and the second engaging grooves 93, 94 are provided, avoiding the inner surface of the bore inner pipe 31. The body ejector pins and the second valve ejector pin 92 respectively push the periphery edge of the bore wall part 21 and the outer periphery of the second semi-circle plate 53, so that the resin shaft 53 and the metal shaft 5 of the throttle valve 3 are hardly deformed.

Third Embodiment

Figure 15A:
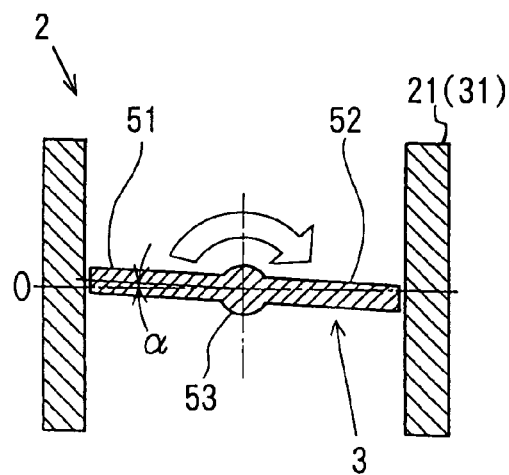
FIGS. 15A and 15B are cross sectional views of the throttle valve for explaining a molding method of the throttle body and the throttle valve according to a third embodiment of the present invention.
Figure 15B:
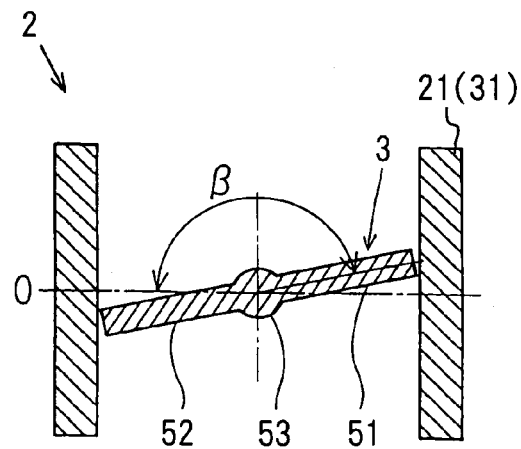

FIGS. 15A and 15B show a third embodiment of the present invention. The throttle valve 3 and the throttle body 2 are molded of a resinous material in the same molding dies. In this situation, a rotation angle (valve forming angle θ) of the throttle valve 3 is set between a rotation angle α ($\geq 0°$) corresponding to the full close position of the throttle valve 3 and a rotation angle β ($\leq 180°$) corresponding to a position of the throttle valve 3, in which the throttle valve 1 contacts the throttle body 2. The relation angle α, β and θ is shown by the following equation (4). Thereby, the outer periphery of the semi-circle plates 51, 52 except the first and the first surfaces 54, 55 and the inner surface of the bore inner pipe 31 can be isolated from each other by the fixed die 61 and the movable die 62.

$$\alpha < \theta < \beta \quad (4)$$

(Modification)

In the aforementioned embodiment, the throttle valve 3 is rotated by the driving motor 1. The present invention can be applied to a mechanical throttle apparatus in which the accelerator pedal is mechanically connected to the throttle valve 3 through a wire cable.

The valve holding part of the metal shaft 5 has a knurled portion in order to firmly connect the metal shaft 5 to the throttle valve 3. The metal shaft 5 and the resin shaft 53 can have width across flats to restrict relative rotation there between.

Before molding, mold release agent or lubricant, such as fluorine resin and molybdenum disulfide can be applied to both ends of the metal shaft 5.

In the aforementioned embodiment, the bore inner pipe 31 and the bore outer pipe 32 have the same center axis. The center axes of bore pipes 31, 32 can be offset to each other.

The bore wall 21 can be single pipe construction.

The aforementioned embodiment includes a blockade recess parts (moisture trapping groove) 34, 35 for blocking moisture. Only blockade recess part 34 can be provided.

The throttle apparatus can include a bypass passage which bypasses the throttle valve 3, and further include an idle speed control valve in the bypass passage to control the amount of the air introduced into the engine. An outlet of a positive crankcase ventilation (PCV) device or a purge tube can be connected to the in take manifold upstream of the bore wall 21. In such an arrangement, the blockade recess part 34 blocks the oil mist and the deposit to restrict a defective operation of the throttle valve 3 and the metal shaft 5.

When the melted resin in injected into the first and the second valve cavities 71, 72 from a valve gate confronting to the outer periphery of the second semi-circle plate 52, only the first insert die 63 may have the first split line 65.

When the melted resin in injected into the first and the second valve cavities 71, 72 from a valve gate confronting to the outer periphery of the first semi-circle plate 51, only the second insert die 64 may have the second split line 66. The melted resin can be injected into the first and the second cavities 71, 72 through a gate which is disposed adjacent to the throttle shaft.

In the first embodiment, the first and the second split lines 65, 66 are positioned on the centerline of the bore wall part 21. However, the split lines 65, 66 can be offset relative to the centerline of the bore wall part 21. AS illustrated in FIG. 14A, the first split line 75 and the second split line 76 can be offset to each other relative to the center line of the bore wall part 21, so that the outer surface of the first and second insert die can be easily cleaned up and ground. The first valve ejector pin 91 can be protruded into the first valve cavity to eject the throttle valve 3 from the first valve cavity 71.

The axis of the throttle valve 3 is of material which is not melt and mixed to the resin material of the throttle valve 3 and the throttle body 2, such as ceramics. A resin shaft as the throttle valve shaft can be used instead of the metal shaft 5. The bore wall 21, the gearbox part 22, the motor housing 23, the first and the second semi-circle plates 51, 52 and the resin shaft 53 can be made of a composite material, such as PBTG30 (polybutylene terephthalate including grass fiber by 30%).

The throttle apparatus can be made of aluminum alloy or magnesium alloy.

What is claimed is:

1. A forming method of a throttle apparatus for an internal combustion engine, the throttle apparatus including a substantially tubular throttle body and a substantially disc-shaped throttle valve, the throttle valve having an axis around which the throttle valve rotate in the tubular throttle body between a close position and an open position, the throttle valve and the throttle body being molded substantially simultaneously in same molding dies in such a manner that the throttle valve is rotated by a predetermined angle with respect to a full closed position in which the throttle valve and the throttle body define a minimum gap therebetween, the forming method of the throttle apparatus, comprising:

clamping a pair of molding dies to form a body cavity and a valve cavity therein, the body cavity being for molding a throttle body and the valve cavity being for molding a throttle valve in such a manner that the throttle valve is rotated by a predetermined angle with respect to a full closed position, so that the throttle valve is not in contact with an inner bore surface of the throttle body;

substantially simultaneously injecting a melted material into the body cavity and the valve cavity;

moving one of said dies away from the other of said dies; and protruding an ejector into the cavities in order to eject a solidified molding, wherein a gas evaporated from the melted material in the body cavity and the valve cavity is expelled from the body cavity and the valve cavity through a gas purge passage which is formed in the molding dies remote from a parting plane where said moving and fixed dies engage.

2. The forming method of a throttle apparatus according to claim 1, wherein the throttle valve is molded in a position in which the throttle valve is full opened position.

3. The forming method of a throttle apparatus according to claim 2, wherein the throttle valve is a butterfly valve including a rotational axis, a first semi-circle plate supported by the rotational axis, and a second semi-circle plate supported by the rotational axis, the valve cavity includes a first valve cavity corresponding to the first semi-circle plate and a second valve cavity corresponding to the second semi-circle plate, the first valve cavity being formed in a first insert die which has a first split line vertically extending with respect to the rotational axis, the second valve cavity being formed in a second insert die which has a second split line vertically extending with respect to the rotational axis, and the gas purge passage is formed in the first split line and the second split line.

4. The forming method of a throttle apparatus according to claim 3, wherein the first split line and the second split line is located on a center axis of the throttle body, and the first insert die and the second insert die are symmetrically arranged to each other with respect to the center axis of the throttle body.

5. The forming method of a throttle apparatus according to claim 3, wherein the first insert die is a two split die disposed in one of the fixed die and the movable die, and the second insert die is a two-spilt die disposed in the other die.

6. The forming method of a throttle apparatus according to claim 1, wherein the throttle valve is a butterfly valve including a rotational axis, a first semi-circle plate supported by the rotational axis, and a second semi-circle plate supported by the rotational axis, the valve cavity includes a first valve cavity corresponding to the first semi-circle plate, and a second valve cavity corresponding to the second semi-circle plate, the molding dies includes a first through hole into which a first ejector pin is inserted, and a second through hole into which a second ejector pin is inserted, and the gas purge passage is formed between the first through hole and the first ejector pin and between the second through hole and the second ejector pin.

7. The forming method of a throttle apparatus according to claim 6, wherein the first semi-circle plate includes a first engaging groove for receiving an end of the first ejector pin, and the second semi-circle plate includes a second engaging groove for receiving an end of the second ejector pin.

8. The forming method of a throttle apparatus according to claim 3, wherein the melted material is injected into the first valve cavity and the second valve cavity through a pair of valve gate which is positioned at a vicinity of a crossing point of the center axis of the throttle body and the rotational axis of the throttle valve, each of the valve gates confronting to each other.

9. The forming method of a throttle apparatus according to claim 1, wherein the melted material is resin material or metal material.

10. The forming method of a throttle apparatus according to claim 1, wherein the throttle valve is made of a composite material of resin containing a filler, the throttle valve includes a disc shaped portion and a cylindrical portion, and the rotational axis is a metal shaft molded in the cylindrical portion.

11. The forming method of a throttle apparatus according to claim 3, wherein the gas purge passage comprises a concave groove on the split lines of the first split die and the second split die and wherein each of the two pieces of the first split die and the second split die are respectively clamped during said molding die movement.

12. The forming method of a throttle apparatus according to claim 1, wherein a bore wall part of the throttle body is formed in a predetermined shape that has a double-piped structure in which a substantially cylindrical-shape bore outer pipe is arranged on the diametrically outer side of a substantial cylindrical-shape bore inner pipe.

13. The forming method of a throttle apparatus according to claim 12, wherein an annular connecting part connects the outer periphery of the bore inner pipe and the inner periphery of the bore out pipe such that the annular connecting part blocks substantially entirely over the circumferential area of the cylindrical space between the bore inner pipe and the bore outer pipe.

14. The forming method of a throttle apparatus according to claim 3, wherein the first and second semi-circle plates are provided with stiffening ribs on one or both sides thereof.

15. The forming method of a throttle apparatus according to claim 3, wherein a range of the width of the first split line and the second split line is 10 to 20 μm.

16. A forming method of a throttle apparatus for an internal combustion engine, the throttle apparatus including a substantially tubular throttle body and a substantially disc-shaped throttle valve, the throttle valve having an axis around which the throttle valve rotate in the tubular throttle body between a close position and an open position, the throttle valve and the throttle body being molded substantially simultaneously in same molding dies, the forming method of the throttle apparatus, comprising:

clamping a pair of molding dies to form a body cavity and a valve cavity therein, the body cavity being for molding a throttle body and the valve cavity being for molding a throttle valve;

injecting a melted material into the body cavity and the valve cavity;

moving one of said dies away from the other of said dies; and protruding an ejector into the cavities in order to eject a solidified molding, wherein a gas evaporated from the melted material in the body cavity and the valve cavity is expelled from the body cavity and the valve cavity through a gas purge passage, the throttle valve is molded in a position in which the throttle valve is in a full opened position, the throttle valve is a butterfly valve including a rotational axis, a first semi-circle plate supported by the rotational axis, and a second semi-circle plate supported by the rotational axis, the valve cavity includes a first valve cavity corresponding to the first semi-circle plate and a second valve cavity corresponding to the second semi-circle plate, the first valve cavity being formed in a first insert die which has a first split line vertically extending with respect to the rotational axis, the second valve cavity being formed in a second insert die which has a second split line vertically extending with respect to the rotational axis, and the gas purge passage is formed in the first split line and the second split line.

* * * * *